United States Patent
Hashimoto et al.

(10) Patent No.: US 6,302,799 B1
(45) Date of Patent: Oct. 16, 2001

(54) DAMPENING DISK ASSEMBLY

(75) Inventors: Hideki Hashimoto, Katano; Takashi Harada; Keisuke Fujioka, both of Shijonawate, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/382,807

(22) Filed: Aug. 25, 1999

(30) Foreign Application Priority Data

Sep. 1, 1998 (JP) ................................................. 10-246998

(51) Int. Cl.[7] ............................... F16D 3/14; F16D 47/02
(52) U.S. Cl. .................... 464/68; 192/214.1; 192/213.31
(58) Field of Search ................................. 464/68, 66, 71, 464/64, 63, 62, 65; 192/213.12, 213.31, 214.1, 106.2, 106.1

(56) References Cited

U.S. PATENT DOCUMENTS

| | | |
|---|---|---|
| 4,560,054 | 12/1985 | Kayanoki et al. . |
| 4,577,742 | 3/1986 | Saida . |
| 4,585,428 | 4/1986 | Asada . |
| 4,586,595 | 5/1986 | Hartig et al. . |
| 4,643,288 | 2/1987 | Tomm et al. . |
| 4,669,595 | 6/1987 | Fischer et al. . |
| 4,684,007 | 8/1987 | Maucher . |
| 4,966,269 | 10/1990 | Raab et al. . |
| 4,998,608 | 3/1991 | Raab et al. . |
| 5,117,959 * | 6/1992 | Graton .................................... 464/68 |
| 5,217,409 * | 6/1993 | Dalbiez ................................... 464/68 |
| 5,238,096 | 8/1993 | Ament et al. . |
| 5,240,458 * | 8/1993 | Linglain et al. ........................ 464/68 |
| 5,246,398 | 9/1993 | Birk et al. . |
| 5,655,967 * | 8/1997 | Lopez et al. ............................ 464/68 |
| 5,673,778 * | 10/1997 | Ament .................................... 464/68 |
| 5,711,407 * | 1/1998 | Maier ..................................... 464/68 |
| 5,769,721 * | 6/1998 | Tauvron et al. ........................ 464/68 |
| 5,795,230 * | 8/1998 | Lefevre .................................. 464/68 |
| 5,829,567 * | 11/1998 | Ament .................................... 464/68 |
| 5,893,446 | 4/1999 | Honjo et al. . |
| 5,975,272 * | 11/1999 | Lefevre .................................. 464/68 |
| 5,984,073 * | 11/1999 | Lohaus et al. ..................... 192/213.2 |
| 6,016,899 * | 1/2000 | Ament .................................... 464/68 |

* cited by examiner

Primary Examiner—Lynne H. Browne
Assistant Examiner—Kenneth Thompson
(74) Attorney, Agent, or Firm—Shinjyu Global IP Counselors, LLP

(57) ABSTRACT

A dampening disk assembly stabilizes friction generated by friction mechanisms within a first range of torsional angle in a separated hub type of clutch disk assembly. An intermediate member (18, 20) is disposed axially between a clutch plate 31 and a retaining plate 32. The first axial side of the intermediate member is supported by the clutch plate 31. The intermediate member (18, 20) has an intermediate plate 18 and a supporting member or fixing plate 20 with a first part 71 and a supporting portion 73 at an inner circumferential portion. An output hub 3 has a flange 64 disposed axially facing the supporting portion 73. The intermediate member (18, 20) and the hub 3 are axially supported by the clutch plate 31. A first friction mechanism 8 is formed between the fixing plate or supporting member 20 and the retaining plate 32. The first friction mechanism 8 includes a friction washer 81 and a first cone spring 49. A second friction mechanism 10 is formed between the flange 64 of the hub 3 and the supporting portion 73 of the fixing plate 20. The second friction mechanism 10 includes a bushing 19 which connects with the hub 3 in a relatively non-rotatable and axially-movable manner and abuts on the supporting portion 73, and a second cone spring 78 disposed axially between the flange 64 and the bushing 19.

16 Claims, 19 Drawing Sheets

DAMPENING DISK ASSEMBLY

BACKGROUND OF THE INVENTION

1. Field of the Invention

This invention generally relates to a dampening disk assembly. More specifically, the present invention relates to a dampening disk assembly of a separated hub type.

2. Background Information

A clutch disk assembly or dampening disk assembly used for a clutch of a car has a clutch function of coupling and/or uncoupling a flywheel of the engine to the transmission shaft, and a dampening function of absorbing and dampening torsion vibrations transmitted from the flywheel. The clutch disk assembly basically includes a clutch disk, a pair of input plates, a hub and elastic portions. The pair of input plates are fixedly coupled to the clutch disk. The hub is disposed on the inner circumferential side of the input plate. The elastic portions elastically couple the hub and the input plates together for movement in a rotary direction. The elastic portions are disposed between the input plates and the hub, and are compressed in a rotary direction when the input plates rotate relatively against the hub. When the clutch disk is coupled with the flywheel, a torque is inputted to the input plates of the clutch disk assembly from the flywheel. The torque is transmitted to the hub via the elastic portions, and then is outputted to the shaft extending from the transmission. When a torque fluctuation is inputted to the clutch disk assembly from the engine, a relative rotation is caused between the pair of input plates and the hub, and the elastic portions are compressed repeatedly in a circular direction.

In addition, the clutch disk assembly typically includes a friction mechanism. The friction mechanism is disposed between the input plates and the hub, and generates a friction resistance when the input plates rotate relatively against the hub. The friction mechanism includes basically a plurality of washers and urging portions.

A clutch disk assembly of a separated hub type has a hub flange (separated flange), which is a flange of a conventional hub separated from a boss. In addition, in the clutch disk assembly of a separated hub type, the boss and the hub flange are coupled in a rotary direction by elastic portions with a low rigidity. The clutch disk assembly of this type allows a wider angular range of relative rotation between the input plates and the hub, and shows a two step rigidity (low rigidity and high rigidity).

The conventional clutch disk assembly of a separated hub type described above includes, for example, a small friction mechanism between a retaining plate (one of the pair of input plates) and the boss of the hub, and a large friction mechanism between the retaining plate and the hub flange. The large friction mechanism includes a first friction portion and a first urging portion. The first friction portion touches the hub flange, and is also connected with the retaining plate relatively non-rotatably and axially movably. The first urging portion is disposed between the first friction portion and the retaining plate, and urges the first friction portion toward the hub flange. The small friction mechanism includes a second friction portion and a second urging portion. The second friction portion touches the flange of the hub and is also connected with the retaining plate in a relatively unrotatable and axially movable manner. The second urging portion is disposed between the second friction portion and the retaining plate, and urges the second friction portion toward the flange side. Generally, the first friction portion is set to have a friction coefficient larger than that of the second friction portion. The first urging portion is set to have an urging force larger than that of the second urging portion. Consequently, the large friction mechanism generates a friction (high hysteresis torque) larger than that of the small friction mechanism.

When the hub flange rotates relatively against the hub within a first range of a torsion angle, the elastic portions with a low rigidity are compressed, and the second friction portion of the small friction mechanism slides against the flange of the hub, resulting in characteristics of low rigidity and low hysteresis torque. After the hub flange starts rotating together with the boss, a relative rotation occurs between the hub flange and the pair of input plates. Within the second range of torsional change, the elastic portions with a high rigidity are compressed between the hub flange and the pair of input plates, and the second friction portion of the large friction mechanism slides against the hub flange, resulting in a characteristic of a high rigidity and high hysteresis torque.

In the clutch disc assembly of a separated hub type mentioned above, both the first and second urging portions are supported by the retaining plate. In such an assembly, there is a danger that the retaining plate is deformed in an axial direction since urging force or resiliency of the first urging portion is large. That is, the axial position of the retaining plate tends to be shifted slightly due to the urging force of the first urging portion. If this happens, the angle of the second urging portion is also changed, and therefore its urging force may be altered. Therefore, hysteresis torque generated by the small friction mechanism cannot be stabilized.

In view of the above, there exists a need for a dampening disk assembly or a clutch disk assembly of a separated hub type, which overcomes the above mentioned problems in the prior art. This invention addresses this need in the prior art as well as other needs, which will become apparent to those skilled in the art from this disclosure.

SUMMARY OF THE INVENTION

One object of the present invention is to stabilize friction generated by the friction mechanisms within the first range of torsional angle.

In accordance with one aspect of the present invention, a dampening disk assembly is provided that includes a first rotary plate, a second rotary plate, an intermediate member, an elastic member, an output hub, a friction generating mechanism and a second urging member. The second rotary plate is disposed at a second axial side of the first rotary plate and is fixedly coupled to the first rotary plate with an interval therebetween. The intermediate member is disposed between the first rotary plate and the second rotary plate, and has a supporting portion at an inner circumferential side thereof. The first axial side of the intermediate member is supported by the first rotary plate. The elastic member couples the first rotary plate and the second rotary plate to the intermediate member elastically in a rotary direction. The output hub is disposed on an inner circumferential side of the intermediate member between the first rotary plate and the second rotary plate. The output hub has a cylinder-shaped portion and a flange extending in a radial direction from the cylinder-shaped portion. The first axial side of the flange is supported by the first rotary plate and is disposed at a first axial side of the supporting portion with an interval therebetween. The friction generating mechanism is disposed between the flange and the supporting portion and generates friction as the output hub rotates relatively against the intermediate member. The friction generating mechanism includes a first friction member and a first urging member. The first friction member is connected with the output hub in a relatively non-rotatable and axially movable manner and contacts the first axial side of the supporting portion. The first urging member is disposed in a compressed manner axially between the flange and the first friction member for applying a resilient force to the first friction member and the flange. The second urging member is disposed in a compressed manner axially between the intermediate member and the second rotary plate for applying a resilient force larger than the resilient force of the first urging member to the intermediate member and the second rotary plate.

According to the above-mentioned dampening disk assembly, the axial position of the intermediate member relative to the first and the second rotary plates is determined by the second urging member which urges the intermediate member and the second rotary plate in opposite axial directions. Also, the axial positions of the hub and the friction member relative to the first and second rotary plates and the intermediate member are determined by the first urging member which gives resilient force to the hub flange and the friction member. More specifically, the flange abuts on the first rotary plate while the friction member abuts on the supporting portion of the intermediate member, axially between the first rotary plate and the supporting portion of the intermediate member, where the first rotary plate and the supporting portion of the intermediate member are axially fixed to each other. Accordingly, it is clear that the resilient force of the second urging member is not exerted on the supporting portion of the intermediate member that is urged by the first urging member. As a result, hysteresis torque which is generated on the friction surface between the supporting portion of the intermediate member and the friction member is stabilized.

In accordance with another aspect of the present invention, a dampening disk assembly is provided such that the intermediate member has an intermediate plate and a supporting member. The first axial side of the intermediate plate is supported by the first rotary plate. The supporting member includes a first part, and a second part that forms the supporting portion. The first part is disposed between the intermediate plate and the second urging member, for receiving a torque from the intermediate plate.

According to the above-mentioned dampening disk assembly, the intermediate member includes the intermediate plate and the supporting member. The supporting member is urged against the intermediate member by the second urging member and is axially integrated with the intermediate plate.

In accordance with another aspect of the present invention, a dampening disk assembly is provided with a second friction member disposed between the first part of the supporting member and the second urging member for rotating together with the second rotary plate.

According to the above-mentioned dampening disk assembly, a large friction is generated between the second friction member and the first part of the supporting member when the first and the second rotary plates rotate relatively against the intermediate plate.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
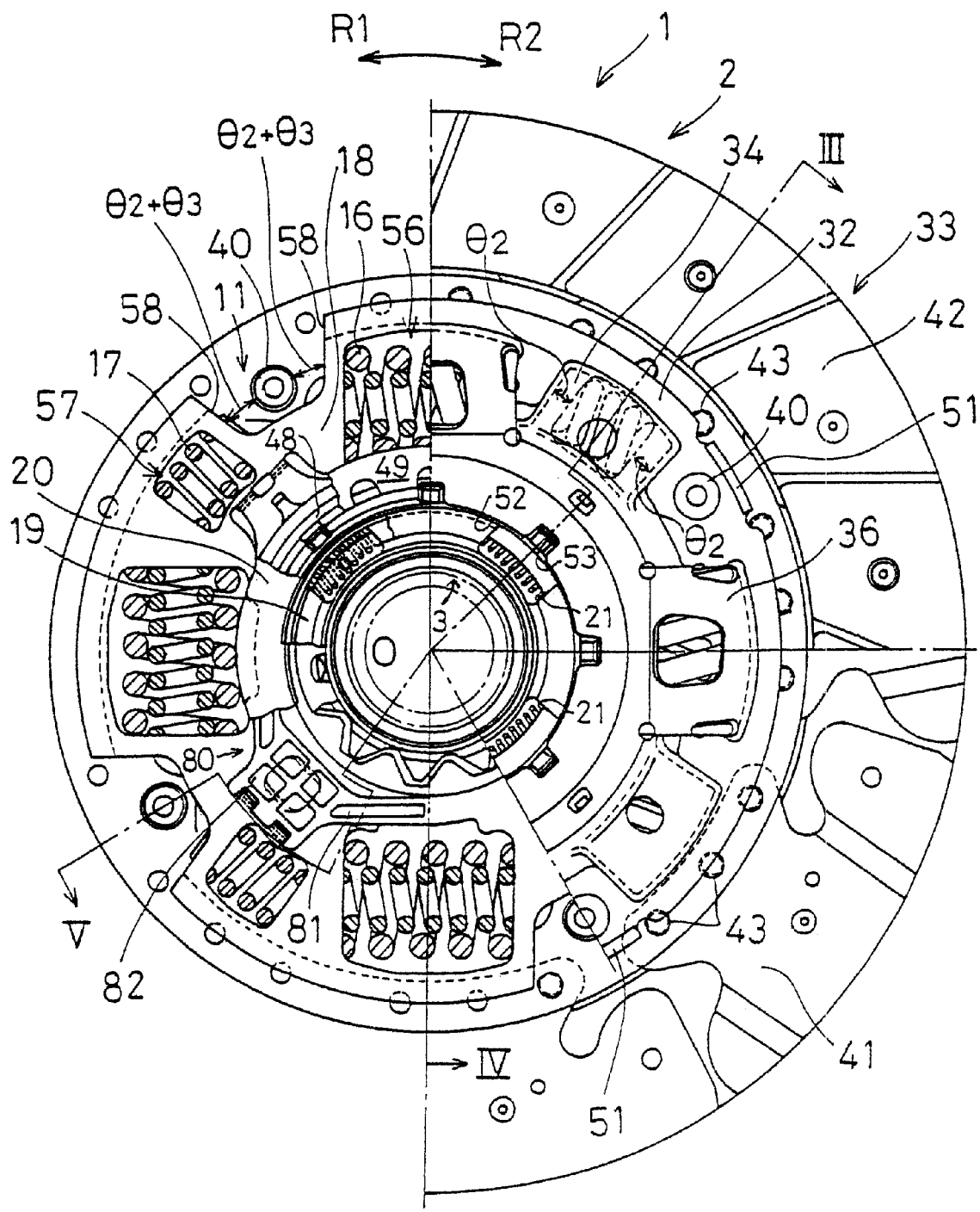
FIG. 1 is a partial side elevational view of a clutch disk assembly in accordance with an embodiment of the present invention with portions broken away for purpose illustration.
Figure 2:
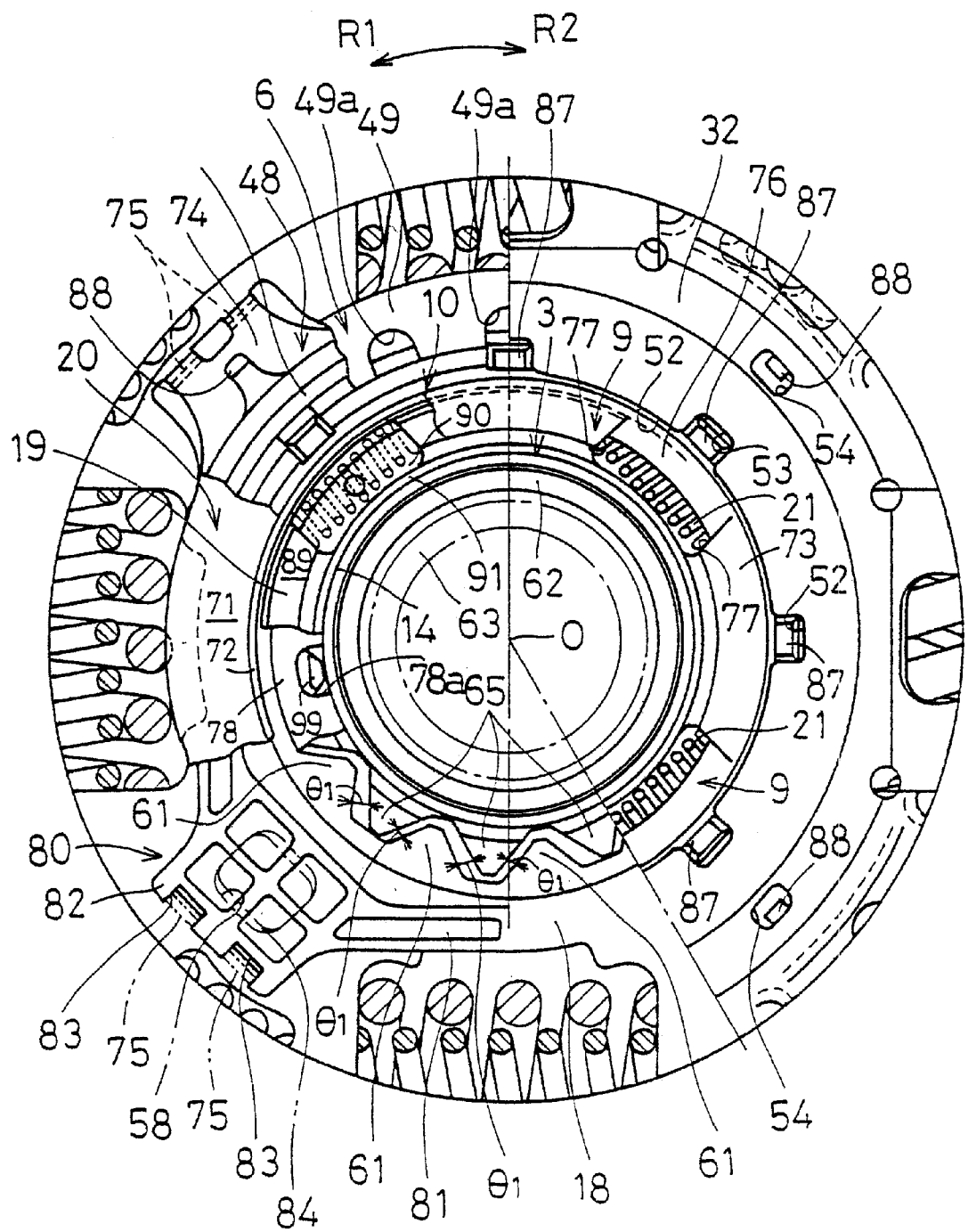
FIG. 2 is an enlarged partial side elevational view of a part of the clutch disk assembly illustrated in FIG. 1 with portions broken away for purposes of illustration.
Figure 3:
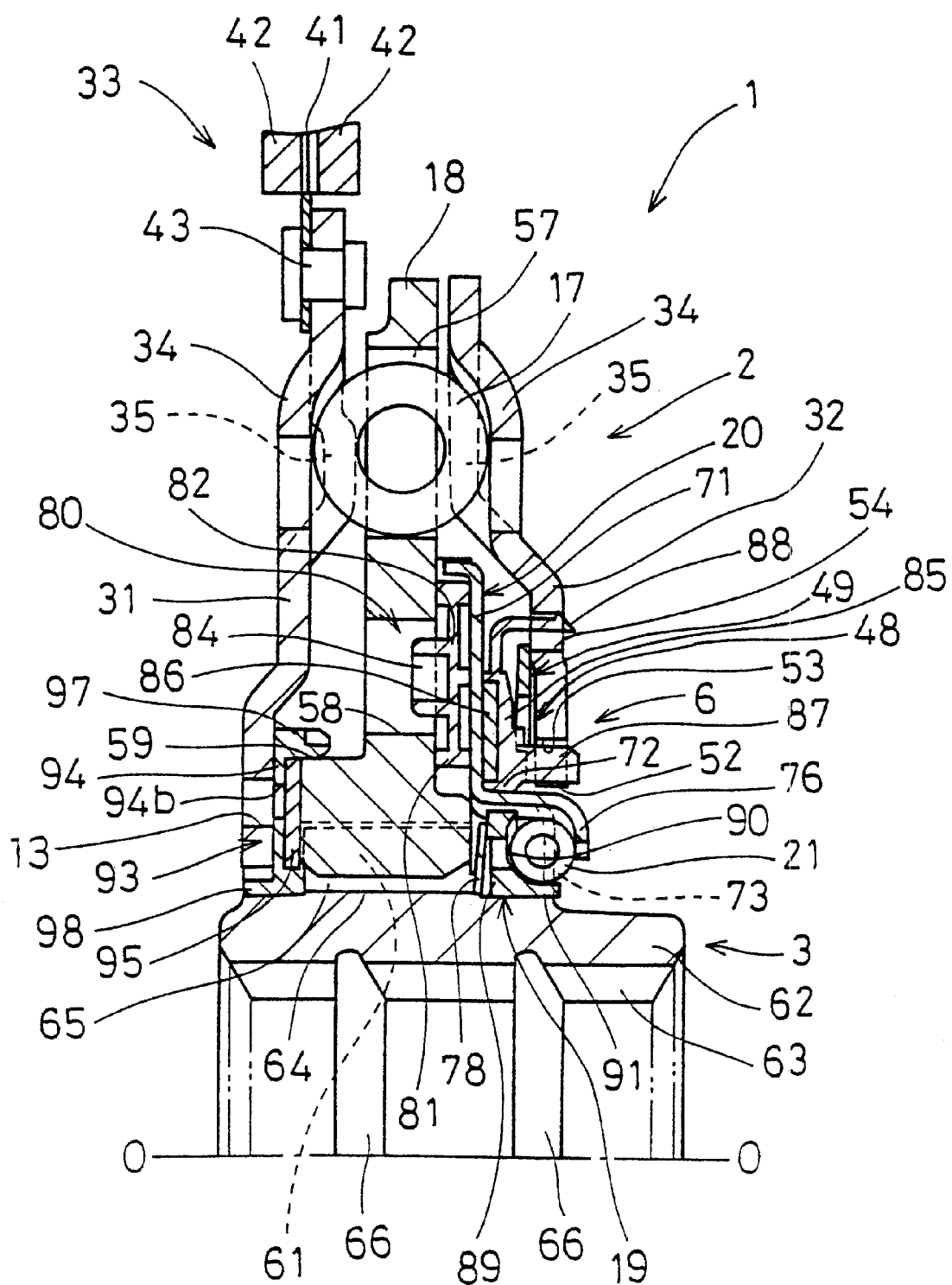
FIG. 3 is an enlarged partial cross sectional view of a part of the clutch disk assembly illustrated in FIG. 1 as viewed along section line O–III of FIG. 1.
Figure 4:
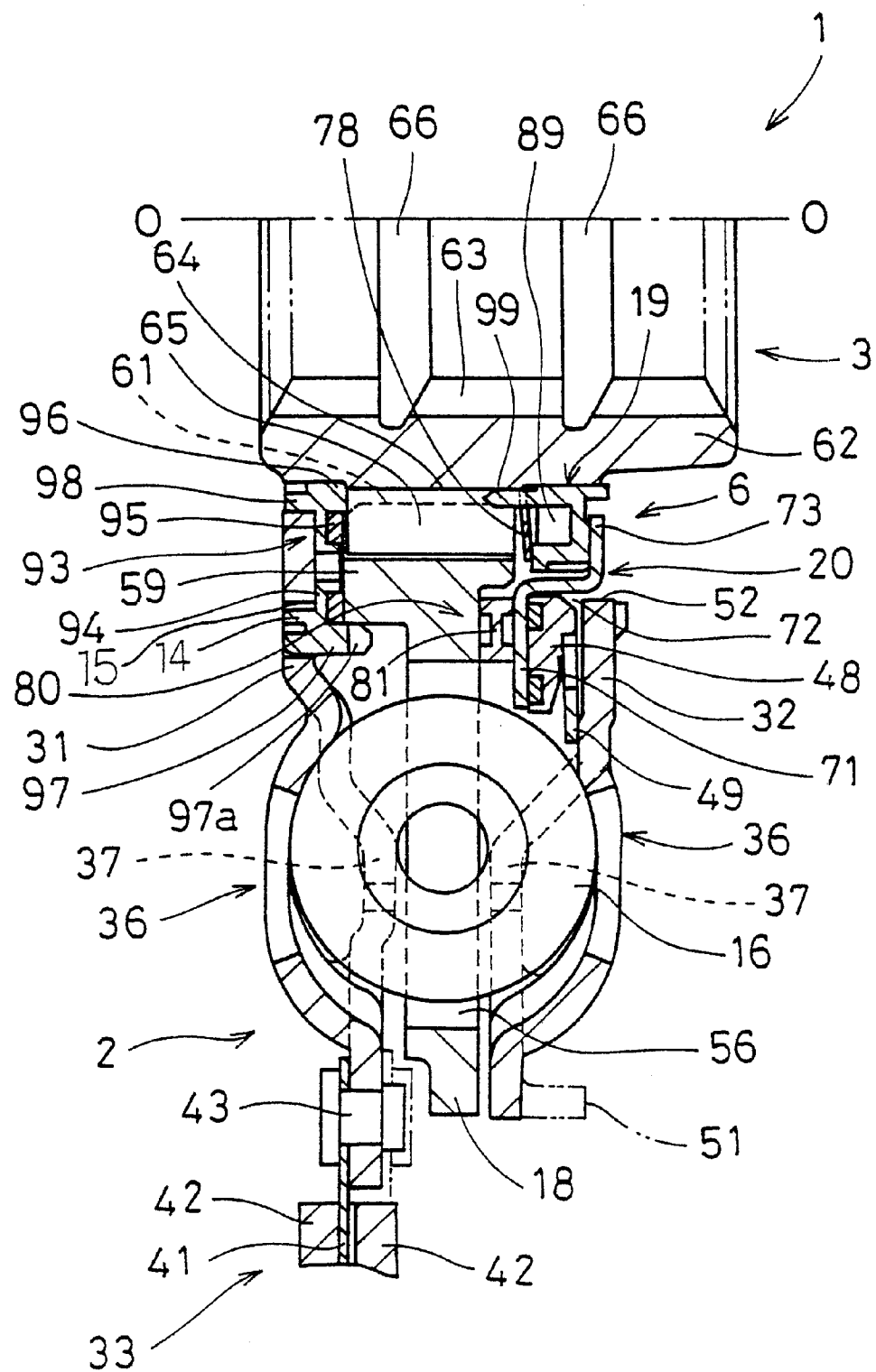
FIG. 4 is an enlarged partial cross sectional view of a part of the clutch disk assembly illustrated in FIG. 1 as viewed along section line O–IV of FIG. 1.
Figure 5:
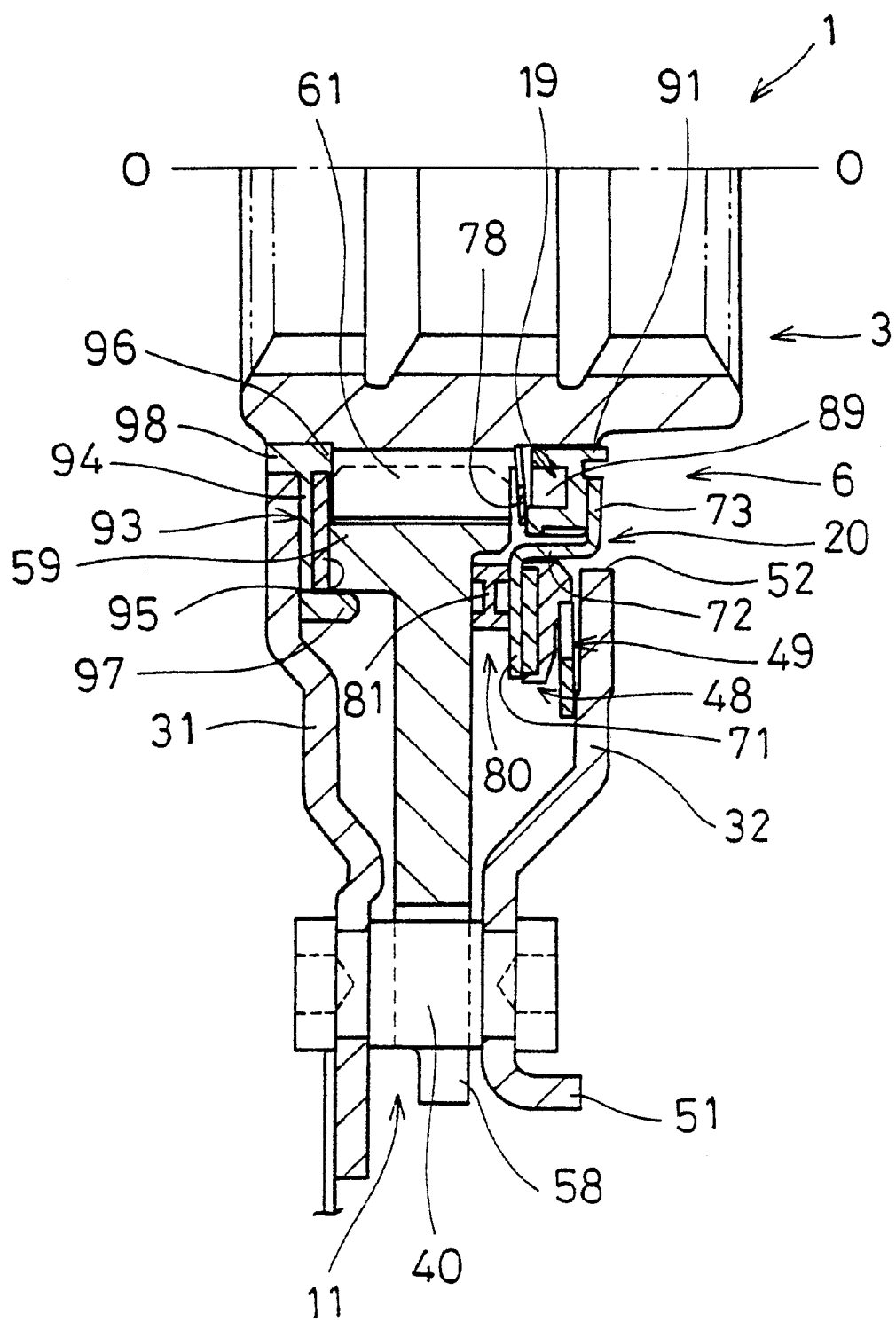
FIG. 5 is an enlarged partial cross sectional view of a part of the clutch disk assembly illustrated in FIG. 1 as viewed along section line O–V of FIG. 1.

Referring initially to FIGS. 1 to 5, a clutch disk assembly 1 is illustrated in accordance with a first embodiment of the present invention. The clutch disk assembly 1 is used for a clutch of a car or other motorized vehicle. On the left side of the clutch disk assembly as viewed in FIGS. 3 to 5, an engine and a flywheel (not shown in Figures) are located, and on the right side as viewed in FIGS. 3 to 5, a transmission (not shown in Figures) is located. Hereinafter, the left side as viewed in FIGS. 3 to 5 is referred to as a first axial side (engine side), and the right side as viewed in FIGS. 3 to 5 is referred to as a second axial side (transmission side). The centerline O—O in each of the drawings represents an axis of rotation or a center of rotation of the clutch disk assembly 1. As shown in FIGS. 1 and 2, an arrow R1 indicates a first rotational direction (positive direction) of the flywheel and the clutch disk assembly 1, while an arrow R2 indicates its opposite rotational direction (negative direction).

Figure 6:
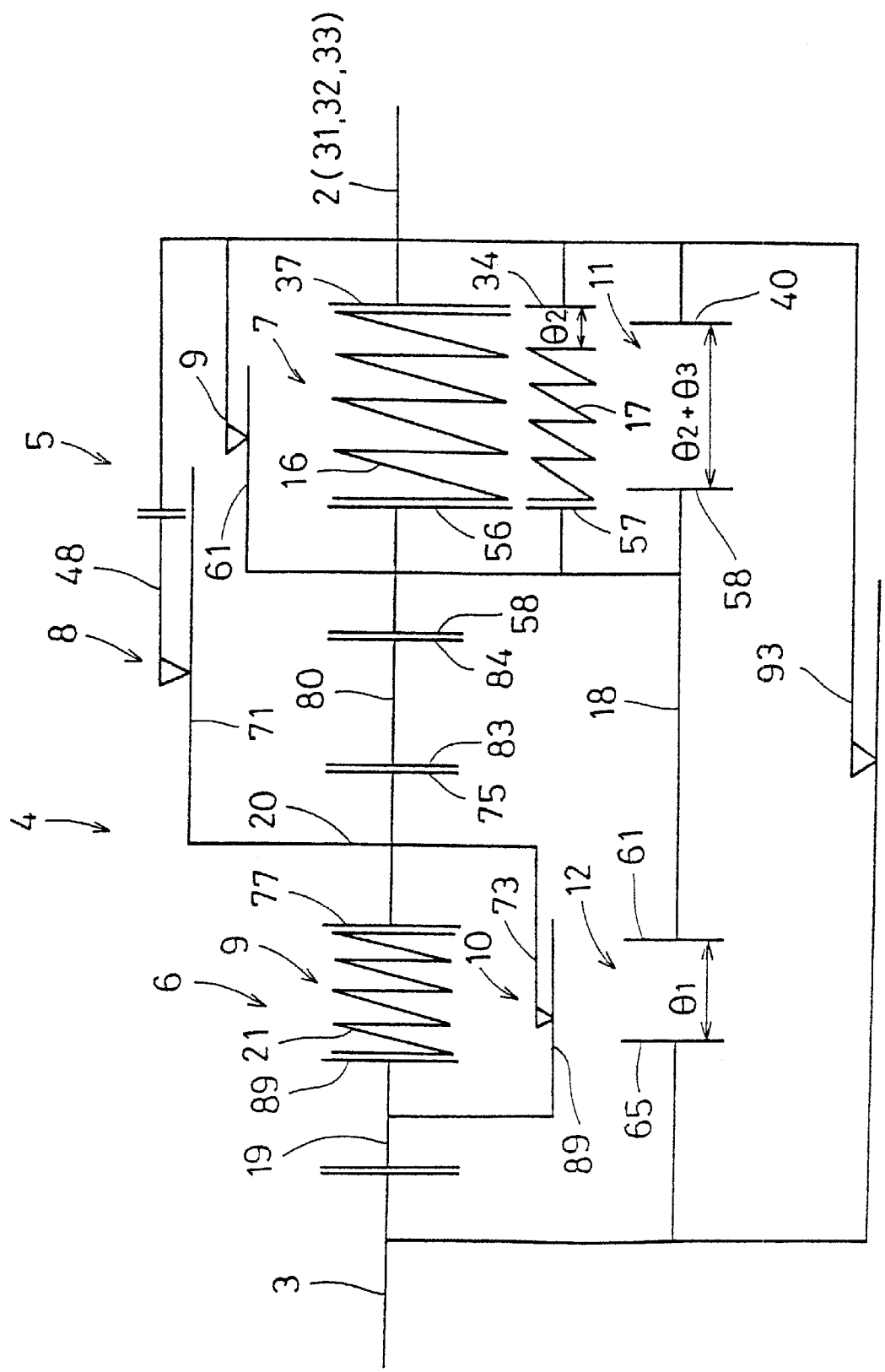
FIG. 6 is a diagrammatic machine circuit drawing of a dampening mechanism utilizing the clutch disk assembly in accordance with the present invention.

A clutch disk assembly 1, as shown in a machine circuit diagram of FIG. 6, mainly includes an input rotary portion 2, a hub or output rotary portion 3, and a dampening mechanism 4 disposed between the input rotary portion 2 and the hub 3. The dampening mechanism 4 includes a first dampening mechanism 5 that functions in a first range of torsion angle, and a second dampening mechanism 6 that functions in a second range of torsion angle. The first dampening mechanism 5 and the second dampening mechanism 6 are disposed between the input rotary portion 2 and the hub 3 so as to operate in series via a hub flange 18 which is an intermediate plate.

Still referring to FIG. 6, the first dampening mechanism 5 basically includes a first elastic mechanism 7, a first friction mechanism 8 and a first stopper 11. The first elastic mechanism 7 has two sets of springs 16 and 17 as seen in FIG. 1. The first friction mechanism 8 generates friction when the hub flange 18 rotates relatively against the input rotary portion 2. The first stopper 11 is a mechanism that controls a relative turning angle between the hub flange 18 and the input rotary portion 2. The first stopper 11 allows the input rotary portion 2 and the hub flange 18 to rotate relatively to each other within a range of a torsion angle of $\theta_2+\theta_3$. The first elastic mechanism 7 (springs 16 and 17), the first friction mechanism 8 and the first stopper 11 are disposed between the hub flange 18 and the input rotary portion 2 so as to operate in parallel.

The second dampening mechanism 6 includes mainly a second elastic mechanism 9, a second friction mechanism 10 and a second stopper 12. The second elastic mechanism 9 is formed of a plurality of second springs 21. Each second spring 21 of the second elastic mechanism 9 has a spring constant, which is set to be smaller than each of the springs 16 of the first elastic mechanism 7. The second friction mechanism 10 is set so as to generate a friction smaller than the friction generated by the first friction mechanism 8. The second stopper 12 is a mechanism to control a relative rotation between the hub 3 and the hub flange 18 and permits the hub 3 and the hub flange 18 to rotate relatively within a range of a torsion angle $\theta_1$. The second elastic mechanism 9, the second friction mechanism 10 and the second stopper 12 are disposed between the hub 3 and the hub flange 18 so as to operate in parallel.

The structure of the clutch disk assembly 1 will now be described in more detail with reference to FIG. 3. The input rotary portion 2 includes a clutch plate 31, a retaining plate 32 and a clutch disk 33. The clutch plate 31 and the retaining plate 32 are disk-shaped members which form annular plate portions that are disposed axially apart from each other by a predetermined distance. The clutch plate 31 is disposed on the first axial side, and the retaining plate 32 is disposed on the second axial side. The outer circumferential parts of the clutch plate 31 and the retaining plate 32 are fixedly coupled to each other by a plurality of stop pins 40 disposed in a circular direction side by side as seen in FIGS. 1 and 5. Consequently, the distance in an axial direction between the clutch plate 31 and the retaining plate 32 is determined by the stop pins 40. The clutch plate 31 and the retaining plate 32 rotate together. A cushioning plate 41 of the clutch disk 33 is fixedly coupled to the outer circumferential part of the clutch plate 31 by a plurality of rivets 43 as seen in FIGS. 1, 3 and 4. An annular friction facing 42 is fixedly coupled to both sides of the cushioning plate 41.

As seen in FIG. 3, several first receptacles 34 are formed in each of the clutch plate 31 and the retaining plate 32 in equal intervals in a circular direction. The first receptacle 34 swells slightly in an axial direction. Each of the first receptacles 34 has first supporting portions 35 on both circular sides thereof. The first supporting portions 35 oppose each other in a circular direction. As seen in FIG. 4, several second receptacles 36 are formed in each of the clutch plate 31 and the retaining plate 32 in equal intervals in a circular direction. The second receptacles 36 are disposed adjacent to the R1 side of each of the first receptacles 34. Each of the second receptacles 36 has a second supporting portion 37 on its both sides in a circular direction. Each second receptacle 36 is longer than the first receptacle 34 in both radial and circular directions as seen in FIG. 1.

As seen in FIGS. 4 and 5, at an outer circumferential edge of the retaining plate 32, a plurality of bent parts 51 that are bent toward the second axis are formed. Each of the bent parts 51 is formed adjacent to the corresponding stop pin 40. The bent parts 51 increase the strength of the circumference of each of the stop pins 40 and the stop pin 40 itself. Therefore, the stop pins 40 can be disposed at the most radially outer sides of the clutch plate 31 and the retaining plate 32, resulting in a high stopping torque. Since the bent parts 51 do not increase the radius of the retaining plate 32, the retaining plate 32 can be smaller in a radial direction in comparison with that of the conventional retaining plate having the same strength. On the other hand, even if the radial length of the retaining plate 32 is the same as that of the conventional retaining plate, the stop pins 40 can be disposed at the more radially outer side of the clutch plate 31 and the retaining plate 32, in comparison with the conventional retaining plate. Since the bent parts 51 are formed partially around the retaining plate 32, the amount of metal plate material needed for the bent parts 51 is not substantial.

As shown in FIGS. 3–5, the hub flange 18 is disposed between the clutch plate 31 and the retaining plate 32, that is, axially between the two plates. The hub flange 18 operates as an intermediate portion between the input rotary portion 2 and the hub 3. The hub flange 18 is a disk-shaped member or annular portion that is thicker than the plates 31 and 32. At the hub flange 18, several first window holes 57 are formed for the corresponding first receptacles 34. The circular angle of each of the first window holes 57 is smaller than the circular angles between the first supporting portions 35 of the first receptacles 34. The centers of a rotary direction of the first window holes 57 coincide approximately with that of the first receptacles 34. Therefore, as seen in FIG. 1, a gap of a torsion angle $\theta_2$ is formed at both sides in a circular direction between the circular ends of the first window holes 57 and the first supporting portions 35 of the first receptacles 34. The springs 17 are installed within the first window holes 57. The springs 17 are coil springs with their circular ends touching the circular ends of the first window holes 57. In this condition, gaps with torsion angles $\theta_2$ exist between both circular ends of the springs 17 and the first supporting parts 35 of the first receptacles 34 as seen in FIG. 1.

As seen in FIG. 4, at the hub flange 18, the second window holes 56 are formed at the locations corresponding to the second receptacles 36. The lengths of the second window holes 56 in radial and circular directions coincide approximately with those of the second receptacles 36. The first springs 16 are disposed within the second window holes 56. The first springs 16 form an elastic portion that includes two kinds of coil springs. The circular ends of first springs 16 touch both of the circular ends of the second window holes 56. In addition, both of the circular ends of the first springs 16 touch the second supporting portions 37 of the second receptacle 36.

As seen in FIGS. 3 and 4, a cylinder-shaped portion 59, which extends in axially both directions, is formed at the inner circumferential part of the hub flange 18. The cylinder-shaped portion 59 has a plurality of internal teeth 61 formed thereon as seen in FIG. 2. These internal teeth 61 extend radially inward from the cylinder-shaped portion 59.

The hub 3 is a cylinder-shaped portion, which is disposed at the inner circumferential side of the plates 31 and 32 as well as at the inner circumferential side of the hub flange 18. In other words, the hub 3 is located at the center of each of these portions. The hub 3 includes mainly a cylinder-shaped boss 62. The hub 3 has a plurality of splines 63 formed at a center hole of the boss 62. Since the splines 63 are connected with the splines of a shaft extending from the transmission, it is possible to output a torque from the hub 3 to the transmission shaft. A flange 64 extends radially outwardly from the boss 62 of the hub 3. In this embodiment, the width of the flange 64 as measured in a radial direction is small. The flange 64 of the hub 3 has a plurality of external teeth 65 extending radially outward therefrom. The external teeth 65 can be thought to form a part of the flange 64 that extends radially outwardly from the boss 62. The external teeth 65 have a radial length corresponding to the cylinder-shaped portion 59 of the hub flange 18. The external teeth 65 extend to a space between the internal teeth 61, and circular gaps of predetermined torsion angles $\theta_1$ formed between the external teeth 65. The torsion angle $\theta_1$ on the R2 side of the external teeth 65 is set to be slightly larger than the torsion angle $\theta_1$ on the R1 side. The internal teeth 61 or the external teeth 65 become circumferentially narrower towards radial ends thereof.

Since both the internal teeth 61 and the external teeth 65 are formed along the entire periphery, the areas which both the internal teeth 61 and the external teeth 65 touch each other increase. In other words, a cutout to dispose an elastic portion having a low rigidity is not formed, which is not the case with conventional teeth. As a result, contact areas between the internal teeth 61 and the external teeth 65 increase. In other words, since a stress to the contact area decreases, an abrasion of the portions is less likely to occur. Consequently, the present teeth system has a characteristic of a higher torque with a smaller space as compared with that in which a part of the teeth is cutout.

The second dampening mechanism 6 will now be described as follows with particular reference being made to FIGS. 3–5 and 8–11. The second dampening mechanism 6 not only transmits a torque between the hub 3 and the hub flange 18, but also absorbs and dampens torsional vibrations. The second elastic mechanism 9 of the second dampening mechanism 6 comprises second springs 21. The second friction mechanism 10 of the second dampening mechanism 6 includes a bushing 19, a fixing plate 20 and a second cone spring 78. The second dampening mechanism 6 is located in a different axial position from the internal teeth 61 and the external teeth 65, which connect the hub 3 and the hub flange 18. In particular, as seen in FIGS. 3–5, the second dampening mechanism 6 is placed on the transmission side relative to the internal teeth 61 and the external teeth 65. In this way, the sufficient contact areas between the internal teeth 61 and the external teeth 65 can be secured. In addition, since the second dampening mechanism 6 is not disposed between the internal teeth 61 and the external teeth 65, which is not the case with conventional mechanisms, the sufficient margin to connect the second springs 21 can be secured. As a result, since a spring sheet is not necessary for this mechanism, the second springs 21 can be assembled more easily.

The fixing plate 20 operates as an input member of the second dampening mechanism 6. In other words, the fixing plate 20 is a portion to which a torque is inputted from the hub flange 18. The fixing plate 20 is a thin metal plate portion disposed between the inner circumference of the hub flange 18 and the inner circumference of the retaining plate 32. As shown in FIGS. 8 to 11, the fixing plate 20 includes a first disk-shaped portion 71, a cylinder-shaped or tubular portion 72 and a second disk-shaped portion 73. The cylinder-shaped portion 72 extends from the inner circumferential edge of the first disk-shaped portion 71 toward the second axial direction (the transmission side). The second disk-shaped portion 73 extends inwardly from the cylinder-shaped portion 72 in a radial direction.

As seen in FIGS. 2–5, a spacer 80 is disposed between the first disk-shaped portion 71 of the fixing plate 20 and the hub flange 18. The spacer 80 connects the fixing plate 20 with the hub flange 18 in a rotary direction, and receives a force which is applied from the fixing plate 20 to the hub flange 18. The spacer 80 comprises an annular portion 81 and a plurality of protrusions 82 projecting from the annular portion 81 outwardly in a radial direction as seen in FIG. 2. Two cutouts 83 are formed at the outer circumferential edge of each of the protrusions 82. A projection 84 extends from each of the protrusions 82 toward the first axial direction as seen in FIG. 3. Projections 84 are inserted in connecting holes 58, which are formed in the hub flange 18. The projections 84 are connected with the connecting holes 58 so as to be slightly movable in a radial direction and relatively unmovable in a rotary direction.

Figure 8:
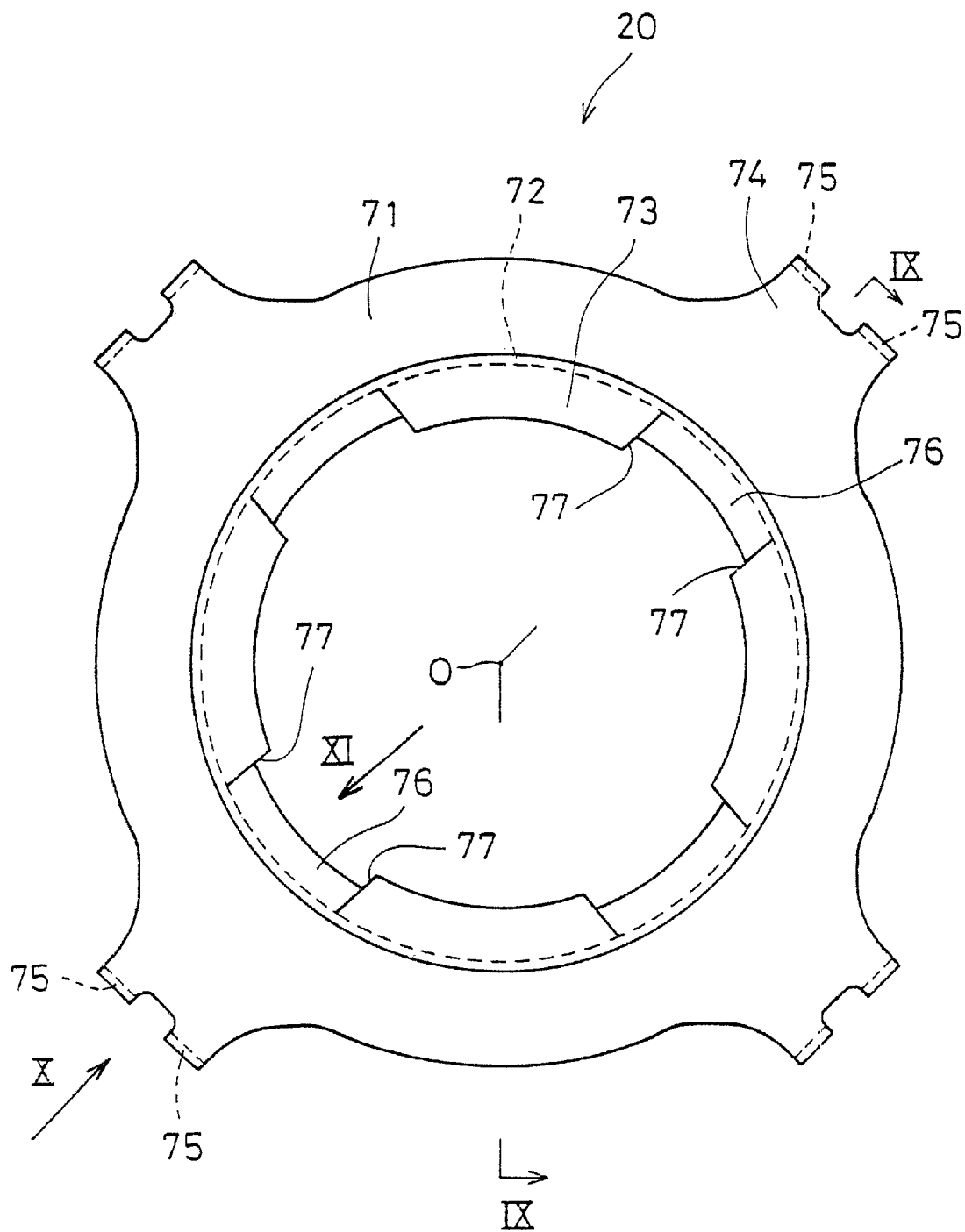
FIG. 8 is a side elevational view of a fixing plate utilized with the clutch disk assembly illustrated in FIG. 1 in accordance with the present invention.
Figure 9:
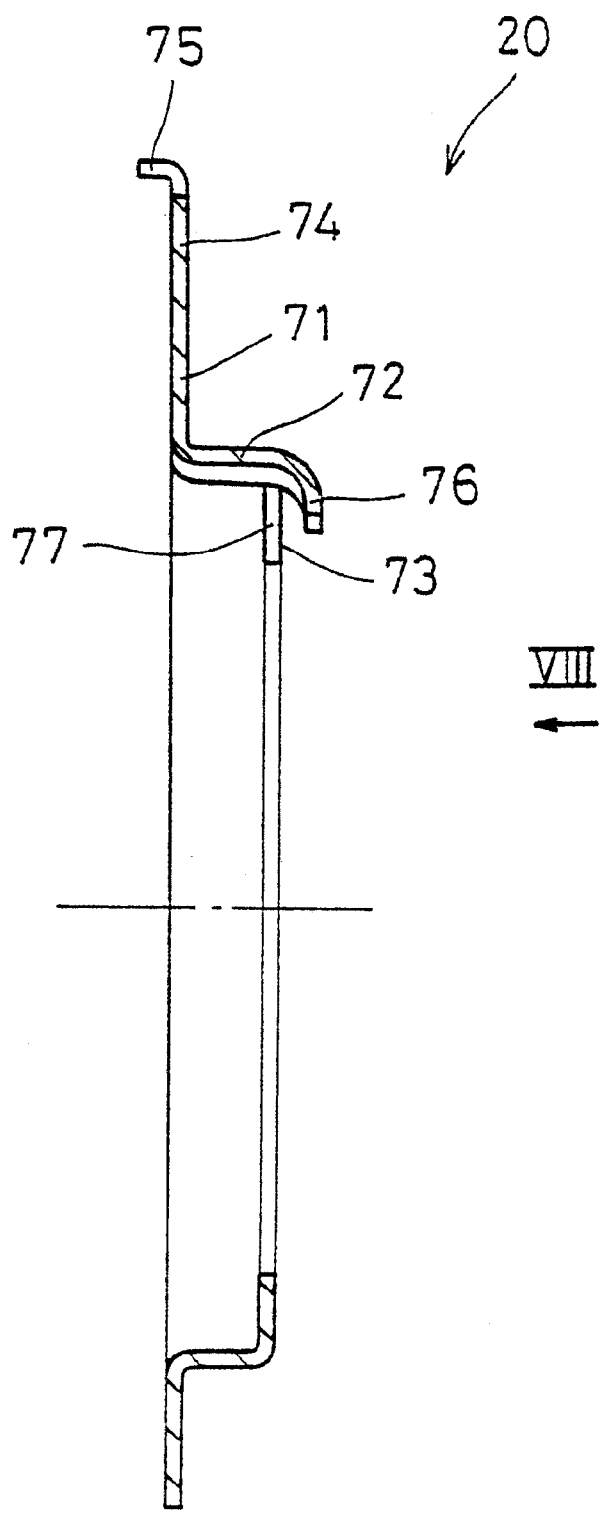
FIG. 9 is a cross sectional view the fixing plate illustrated in FIG. 8 as viewed along section line IX—IX of FIG. 8.
Figure 10:
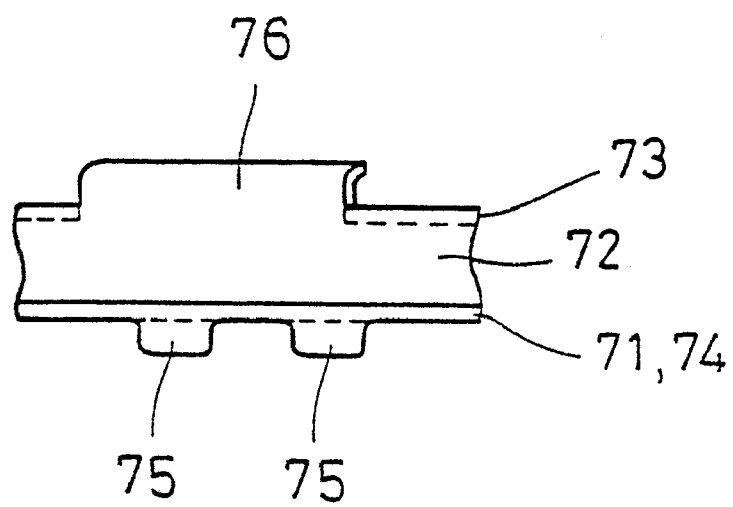
FIG. 10 is a partial edge elevational view of a part of the fixing plate illustrated in FIG. 8 as viewed along an arrow X of FIG. 8.
Figure 11:
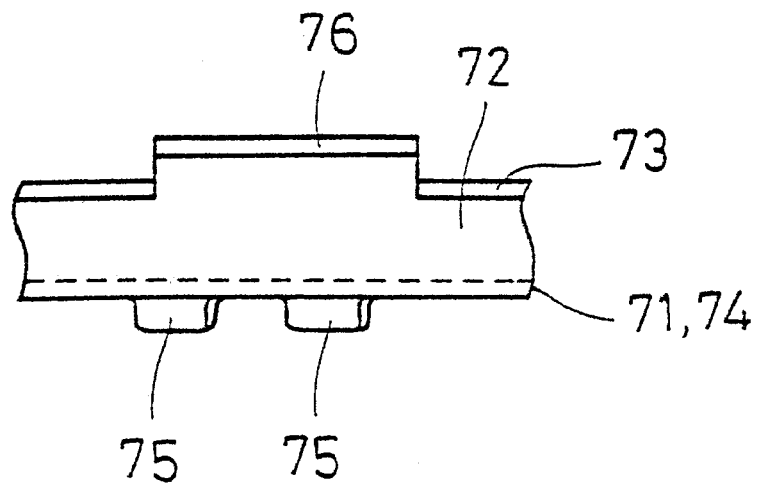
FIG. 11 is a partial edge elevational view of a part of the fixing plate illustrated in FIG. 8 as viewed along an arrow XI of FIG. 8.
Figure 12:
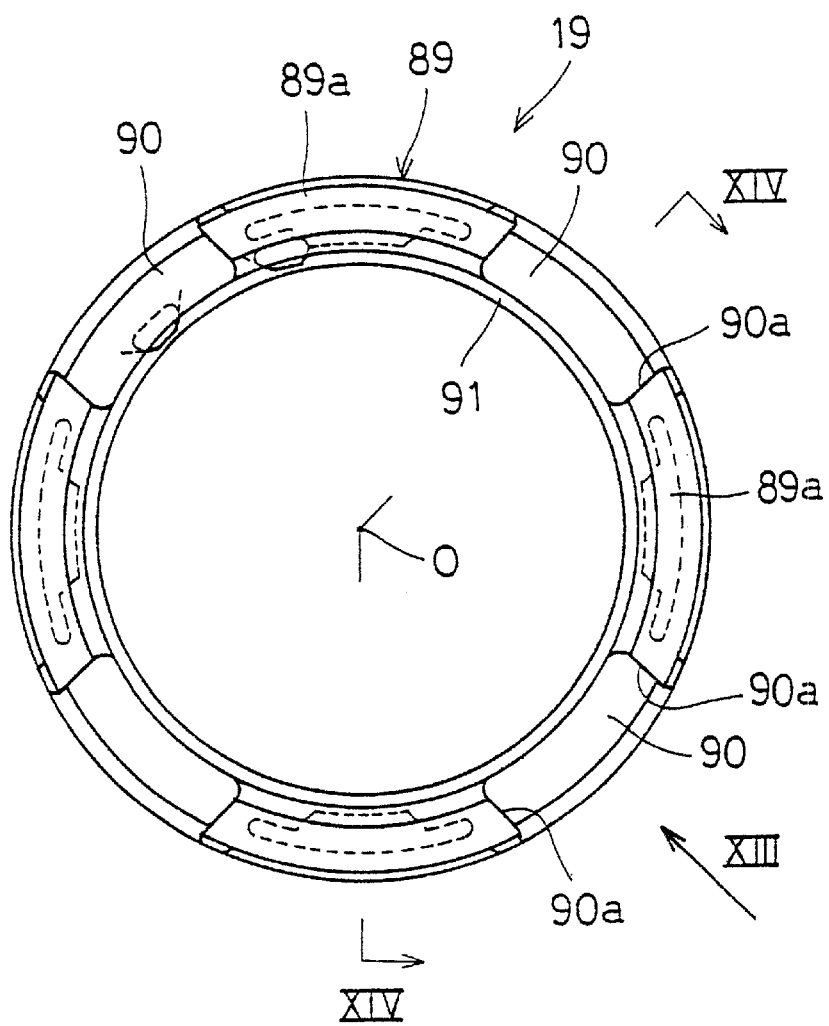
FIG. 12 is a front side elevational view of a bushing utilized with the clutch disk assembly illustrated in FIG. 1 in accordance with the present invention.
Figure 13:
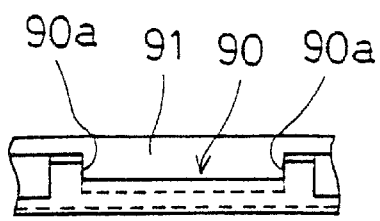
FIG. 13 is a partial edge elevational view of a part of the bushing illustrated in FIG. 12 as viewed along an arrow XIII of FIG. 12.

As seen in FIGS. 2 and 8, the fixing plate 20 has four protrusions 74. Protrusions 74 project outwardly in a radial direction at equal intervals in a circular direction from the first disk-shaped portion 71 of the fixing plate 20. Each of the protrusions 74 is formed corresponding to the protrusions 82 of the spacer 80. Nails or tabs 75 of protrusions 74 are located within the cutouts 83 which are formed at the ends of the protrusions 82 of the spacer 80. In the structure mentioned above, the fixing plate 20 is fixedly connected with the hub flange 18 via the spacer 80 to be relatively unrotatable relative to each other. In other words, the fixing plate 20 is connected to hub flange 18 so that a torque can be transmitted from the hub flange 18 to fixing plate 20. In addition, the hub flange 18 via the spacer 80 supports the first axial side of the fixing plate 20 . The fixing plate 20 is movable toward the second direction with respect to the spacer 80 and the hub flange 18.

Referring to FIGS. 1–5, the first friction mechanism 8 that is formed between the fixing plate 20 and the retaining plate 32 will now be described in more detail. The first friction mechanism 8 includes a first friction washer 48 and a first cone spring 49. The first friction washer 48 is connected with the retaining plate 32 so as to be relatively non-rotatable, but axially movable relative to each other, and generates a friction by sliding against the fixing plate 20. The first friction washer 48 comprises mainly an annular-shaped resin portion. The first friction washer 48 includes an annular portion 85 made of a resin, and a friction portion 86.

The friction portion 86 is molded to or bonded to the fixing plate 20 side of the annular portion 85. The friction portion 86 is a portion that is designed to increase a friction coefficient between the first friction washer 48 and the fixing plate 20, and has an annular or disk-like shape. The annular portion 85 has a plurality of rotationally connecting portions 87 extending toward the second axial side. These rotationally connecting portions 87 are formed at the inner circumference of the annular portion 85. The rotationally connecting portions 87 are inserted in a plurality of cutouts 53 which are formed in a center hole 52 (inner circumferential edge) of the retaining plate 32. In this way, the first friction washer 48 is connected with the retaining plate 32 in a relatively non-rotatable, but axially movable manner. In addition, in the annular portion 85, connecting portions 88, which extend outwardly in a radial direction from the outer circumferential edge and then toward the second axial side are formed. The connecting portions 88 are relatively thin and have a tab or detent portion at the end. The connecting portions 88 are inserted in holes 54, which are formed at the retaining plate 32, and its tab or detent portions of connecting portions 88 are connected with the retaining plate 32. The connecting portions 88 urge itself outwardly in a radial direction while connected, and press itself against the holes 54. Therefore, after partial assembling (subassembling), the first friction washer 48 is not removed easily from the retaining plate 32. In this way, in the first friction washer 48, the rotationally connecting portions 87 transmit a torque, whereas the connecting portions 88 connect temporarily a portion of first friction washer 48 with the retaining plate 32. The connecting portions 88 are thin and able to bend. Since the connecting portions 88 have a low rigidity, they hardly brake during subassembling. Therefore, since a force is not applied to the rotationally connecting portions 87 during subassembling, the first friction washer 48 is less likely to be broken than the conventional resin friction washers which have a similar tab or detent portion of to be connected to a retaining plate 32. In addition, since a press fitting machine is not necessary to subassemble the friction washer 48, costs for equipment can be reduced.

The first cone spring 49 is disposed between the first friction washer 48 and the inner circumference of the retaining plate 32. The first cone spring 49 is compressed in an axial direction between the retaining plate 32 and the first friction washer 48. The outer circumferential edge of the first cone spring 49 is supported by the retaining plate 32, while the inner circumferential edge of the first cone spring 49 contacts the annular portion 85 of the first friction washer 48. As seen in FIG. 2, the first cone spring 49 has a plurality of cutouts 49a formed on its inner circumferential side. It can be said that the cutouts 49a at the inner circumferential edge form a plurality of projections on the inner circumferential edge of first cone spring 49. Projection parts that are formed on the outer circumferential side of the rotationally connecting portions 87 of the first friction washer 48 are inserted in the cutouts 49a. In this way, the first cone spring 49 is connected with the first friction washer 48 in a relatively non-rotatable manner.

Referring to FIGS. 8–11, at the second disk-shaped portion 73 of the fixing plate 20, several cut and lift parts 76 are formed at equal intervals in a circular direction. The cut and lift parts 76 are formed by cutting and lifting portions of the inner circumferential end of the second disk-shaped portion 73 in the axial direction. The cut and lift parts 76 are disposed closer to the second axial side compared with other parts of the second disk-shaped portion 73. At a part of the second disk-shaped portion 73 where the cut and lift parts 76 are formed, a cutout part is formed as seen in FIG. 8. A supporting part 77 is formed at both ends of the cutout part in a circular direction.

Figure 14:
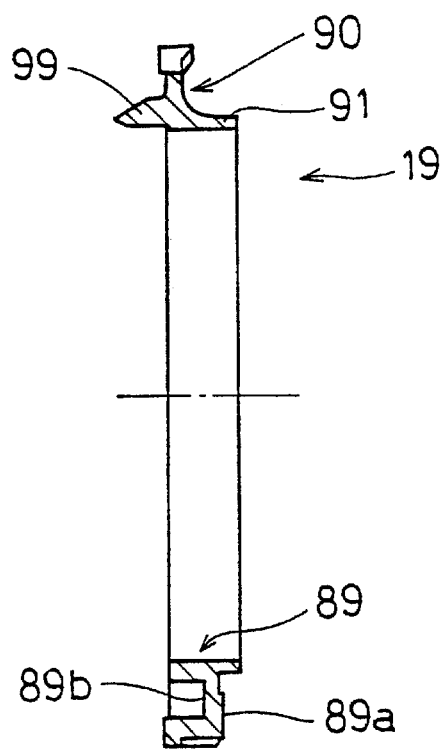
FIG. 14 is a cross sectional view of the bushing illustrated in FIG. 12 as viewed along section line XIV—XIV in FIG. 12.
Figure 15:
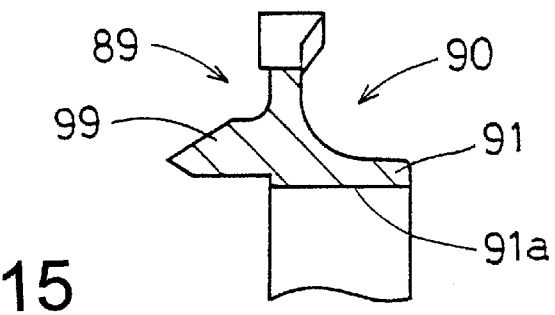
FIG. 15 is an enlarged, partial cross sectional view of a part the bushing illustrated in FIGS. 12–14.

A bushing 19 operates as an output portion in the second dampening mechanism 6. The bushing 19 is connected with the hub 3 in a relatively non-rotatable manner. In particular, the bushing 19 is an annular resin portion, which is disposed on the second axial side of both the internal teeth 61 of the hub flange 18 and the external teeth 65 of the hub 3. The bushing 19 is also located on the inner circumferential side of the cylinder-shaped portion 72 of the fixing plate 20, and in a space on the outer circumferential side of the second axial side part of the boss 62. The bushing 19 includes mainly an annular portion 89 with a plurality of spring receptacles 90, as shown in FIGS. 12 to 19. The spring receptacles 90 are formed at equal intervals in a circular direction at the side face of the second axial side of the annular portion 89. The spring receptacles 90 are formed at locations corresponding to the cut and lift parts 76 or the cutout parts of the fixing plate 20. The spring receptacles 90 are concave parts that are formed at the side face of the bushing 19 on the second axial side. Each of the concave parts, as shown in FIGS. 14 and 15, has a cross section of a part of a circle. In addition, a hole is formed that penetrates in an axial direction in each spring receptacle 90 at its center in both radial and circular directions. At the inner circumference of the annular portion 89, an inner circumferential supporting part 91 is formed with a cylinder like shape. The supporting part 91 extends toward the second axial side from the annular portion 89. An inner circumferential face 91a of the bushing 19 is formed by the inner circumferential supporting part 91. This inner face 91a touches or is close to the outer circumferential face of the boss 62. A side face 89a is formed on the second axial side of the annular portion 89 of the bushing 19. This side face 89a touches the side face of the first axial side of the second disk-shaped portion 73 of the fixing plate 20.

The second friction mechanism 10 is formed between the annular portion 89 of the bushing 19 and the second disk-shaped portion 73 of the fixing plate 20. The second springs 21 are disposed within each of the spring receptacles 90. The second springs 21 are preferably coil springs that are smaller than the first spring 16 or the spring 17. The second spring 21 also has spring constants that are smaller than the first spring 16 or the spring 17. The second springs 21 are disposed within the spring receptacles 90 with the ends of the second springs 21 in a circular direction touching or close to both ends of the spring receptacles 90 in a circular direction. Both the axial inner sides (the first axial side) and the inner circumferential sides of the second springs 21 are supported by the bushing 19 within the spring receptacles 90.

The supporting parts 77 of the fixing plate 20 are connected in a rotary direction with both circular ends of the second springs 21. In this way, a torque is transmitted from the fixing plate 20 to the bushing 19 via the second springs 21. The first axial side of the end face of the second springs 21 in a circular direction is totally supported by the circular end of the spring receptacles 90. In addition, the circular end faces of the second springs 21 are supported by supporting parts 77. Thus, the second spring 21 has a large connecting margin at both circular ends. In other words, the area of the circular ends of the second springs 21 that is supported by the supporting parts 77 is large. This arrangement is made possible by disposing the second springs 21 at a location that is shifted in an axial direction from the conventional location, which is between a hub and hub flange. Consequently, a spring sheet is not necessary, resulting in a fewer number of parts.

The cut and lift parts 76 are disposed so as to support the axial outer side (the second axial sides) of the second springs 21. Thus, the outer circumferential side and the outer axial sides of the second springs 21 are supported by the fixing plate 20.

Figure 16:
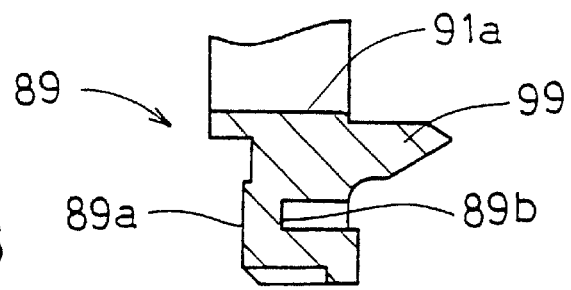
FIG. 16 is an enlarged, partial cross sectional view of a part the bushing illustrated in FIGS. 12–15 as viewed along section line XVI—XVI of FIG. 17.
Figure 17:
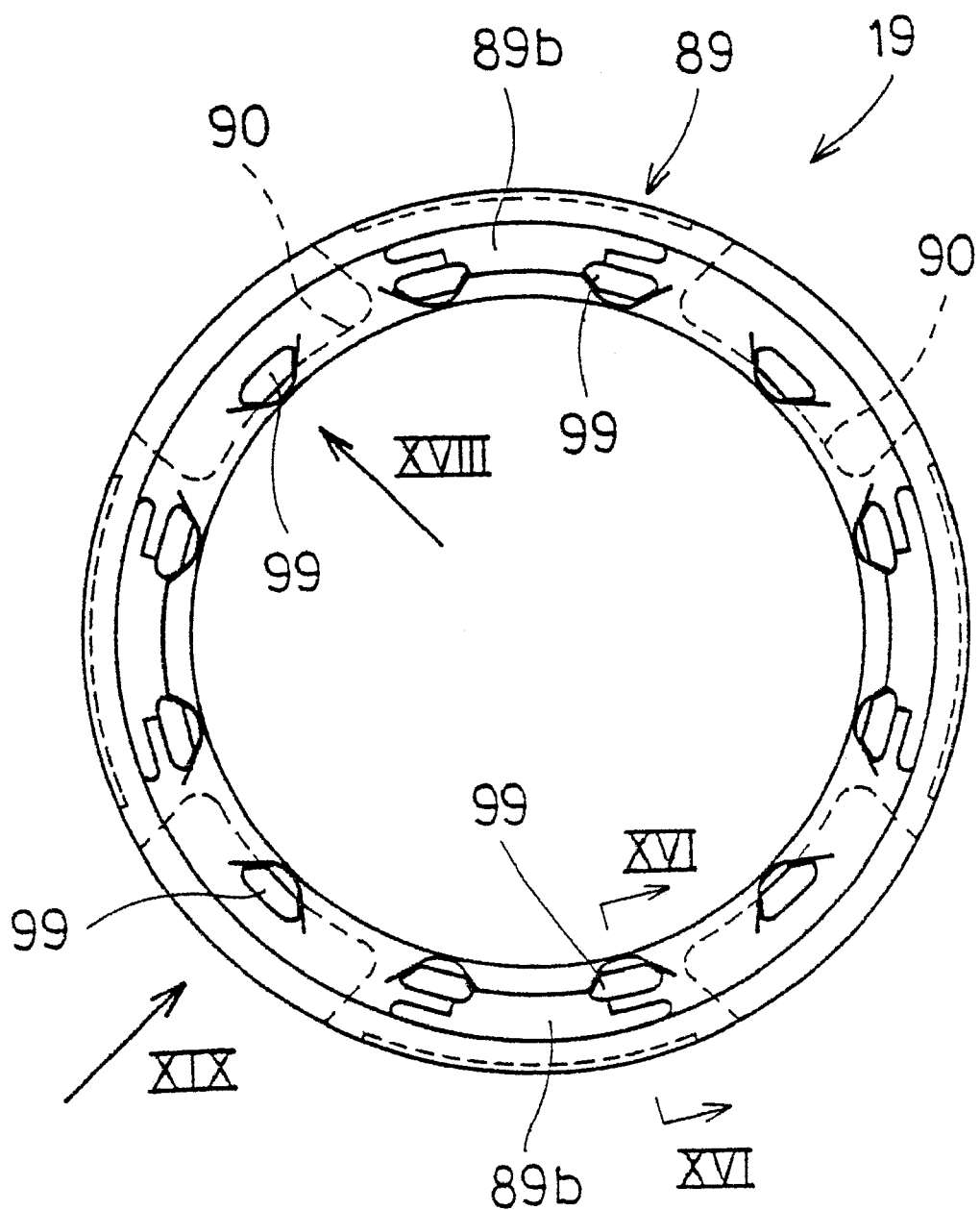
FIG. 17 is a back side elevational view of the bushing illustrated in FIGS. 12–16 for use with the clutch disk assembly illustrated in FIG. 1 in accordance with the present invention.
Figure 18:
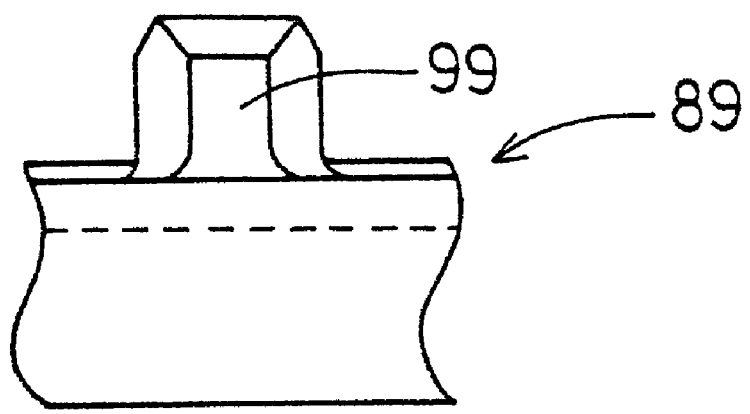
FIG. 18 is an enlarged, partial cross sectional view of a part the bushing illustrated in FIGS. 12–17 as viewed along an arrow XVIII of FIG. 17.
Figure 19:
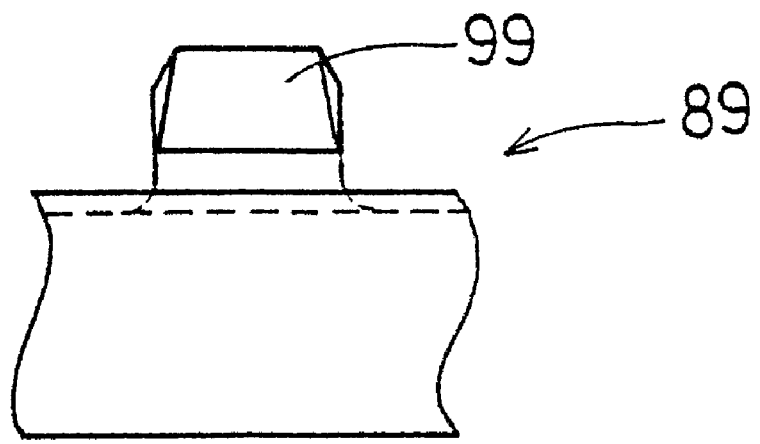
FIG. 19 is an enlarged, partial cross sectional view of a part the bushing illustrated in FIGS. 12–18 as viewed along an arrow XIX in FIG. 17.

As shown in FIGS. 4, 16 and 17, several connecting parts 99 are formed at the bushing 19 that extend from the annular portion 89 toward the first axial side. The connecting parts 99 are projections that extend toward the first axial side for transmitting a torque from the bushing 19 to the hub 3. The connecting parts 99 have cross sections that fit into gaps between the external teeth 65. The connecting parts 99 are inserted between the external teeth 65 of the hub 3. Thus, the connecting parts 99 are connected with the external teeth 65 in an unmovable manner in the circular direction.

A second cone spring 78 is an urging portion in the second friction mechanism 10 adapted to urge the second disk-shaped portion 73 and the annular portion 89 axially towards each. The second cone spring 78 is disposed axially between the bushing 19 and the external teeth 65 of the hub 3, and between the bushing 19 and the internal teeth 61 of the flange 18. The inner circumference of the second cone spring 78 is supported by the flange 64 of the hub 3, while the outer circumference of the second cone spring 78 touches the annular portion 89 of the bushing 19. The second cone spring 78 is compressed in an axial direction, and urges the bushing 19 toward the second axial side. As a result, the side face 89a of the second axial side of the annular portion 89 of the bushing 19 and the side face of the first axial side of the second disk-shaped portion 73 of the fixing plate 20 are urged towards each other in an axial direction by a predetermined force. The second cone spring 78 has inner and outer diameters smaller than those of the first cone spring 49. The second cone spring 78 also has a thickness that is much smaller than that of the first cone spring 49. Thus, an urging force of the second cone spring 78 is much smaller than that of the first cone spring 49. The second cone spring 78 has a plurality of cutouts formed at an inner circumferential edge thereof. It can be regarded that the cutouts of the cone spring 78 form a plurality of projections formed at the inner circumferential edge. The connecting parts 99 mentioned above extend within the cutouts of the cone spring 78.

As described above, the fixing plate 20 operates in the second dampening mechanism 6 as an input portion to connect with the second springs 21, as a portion constituting the second friction mechanism 10, and as a portion constituting the first friction mechanism 8. Advantages of using the fixing plate 20 are described hereinafter. The fixing plate 20, as described above, operates in the second dampening mechanism 6 as a supporting portion to support both ends of the second springs 21 in a circular direction and as a portion constituting the second friction mechanism 10. Thus, one portion has two functions, resulting in a smaller number of parts used. In addition, the fixing plate 20 supports the axial outer side of the second spring 21. Furthermore, the fixing plate 20 includes friction faces for both the second friction mechanism 10 and the first friction mechanism 8, where the second friction mechanism 10 generates a friction by sliding within the first torsional range and the first friction mechanism 8 generates a friction by sliding within the second torsional range. Thus, one portion has two friction faces, resulting in an easy adjustment and control of the friction characteristic of both friction faces. In other words, friction faces for both a flange of a boss and a hub flange do not need to be controlled, which is not a case with a conventional dampening mechanism. Particularly, the fixing plate 20 has a size and a structure that is smaller and simpler than conventional hubs or hub flanges, it is easy to control its friction face. Since the fixing plate 20 mentioned above is made of a metal plate, the fixing plate 20 with a desired shape can be obtained easily by press working, resulting in a low manufacturing cost of the fixing plate 20.

A still another advantage of the bushing 19 is described as follows. Since the bushing 19 is made of a resin, its desired shape can be obtained easily. Particularly, since the bushing 19 is made of a resin, the bushing 19 can be formed with the connecting parts 99 integrated therein, thereby making the production easy. The connecting parts 99 are connected to spaces defined circularly between the external teeth 65 of the hub 3. Therefore, it is not necessary to form a hole or concave on the connecting part 99 to connect the connecting part 99 with the hub 3. Consequently, the number of manufacturing steps for the hub 3 does not increase. The bushing 19 operates as an output portion of the second dampening mechanism 6. The bushing 19 connects with both circular ends of the second springs 21, and constitutes a part of the second friction mechanism 10. In other words, a single member performs a torque transmission and friction generation, resulting in reduced number of manufacturing parts.

The second cone spring 78 which urges the friction faces axially away from each other in the second friction mechanism 10 is supported by the flange 64 of the hub 3. Thus, the second cone spring 78 is not supported by a retaining plate but by a different member, which is not the case with a conventional retaining plate. Therefore, a hysteresis torque within the first torsional range is stable. Thus, it is easy to control the hysteresis torque of the first range. In prior arts, a retaining plate supports both first and second urging portions. Therefore, urging force of a first elastic portion may deform the retaining plate, resulting in a change of an angle of a second urging portion, destabilizing urging force of the second urging portion. In this embodiment, an urging force of the first cone spring 49 and that of the second cone spring 78 are applied in opposite axial directions with respect to the fixing plate 20. In other words, the first cone spring 49 urges the fixing plate 20 via the first friction washer 48 toward the first axial side, whereas the second cone spring 78 urges the fixing plate 20 via the bushing 19 toward the second axial side.

The second stopper 12 has a structure that does not transmit a torque to each portion of the second dampening mechanism 6 when the torque is large. When a torque is within the second torsional range, the torque is not transmitted to the bushing 19, the second coil springs 21 and the fixing plate 20. Consequently, strength of each portion does not need to be increased, and design of these members is easy.

Figure 20:
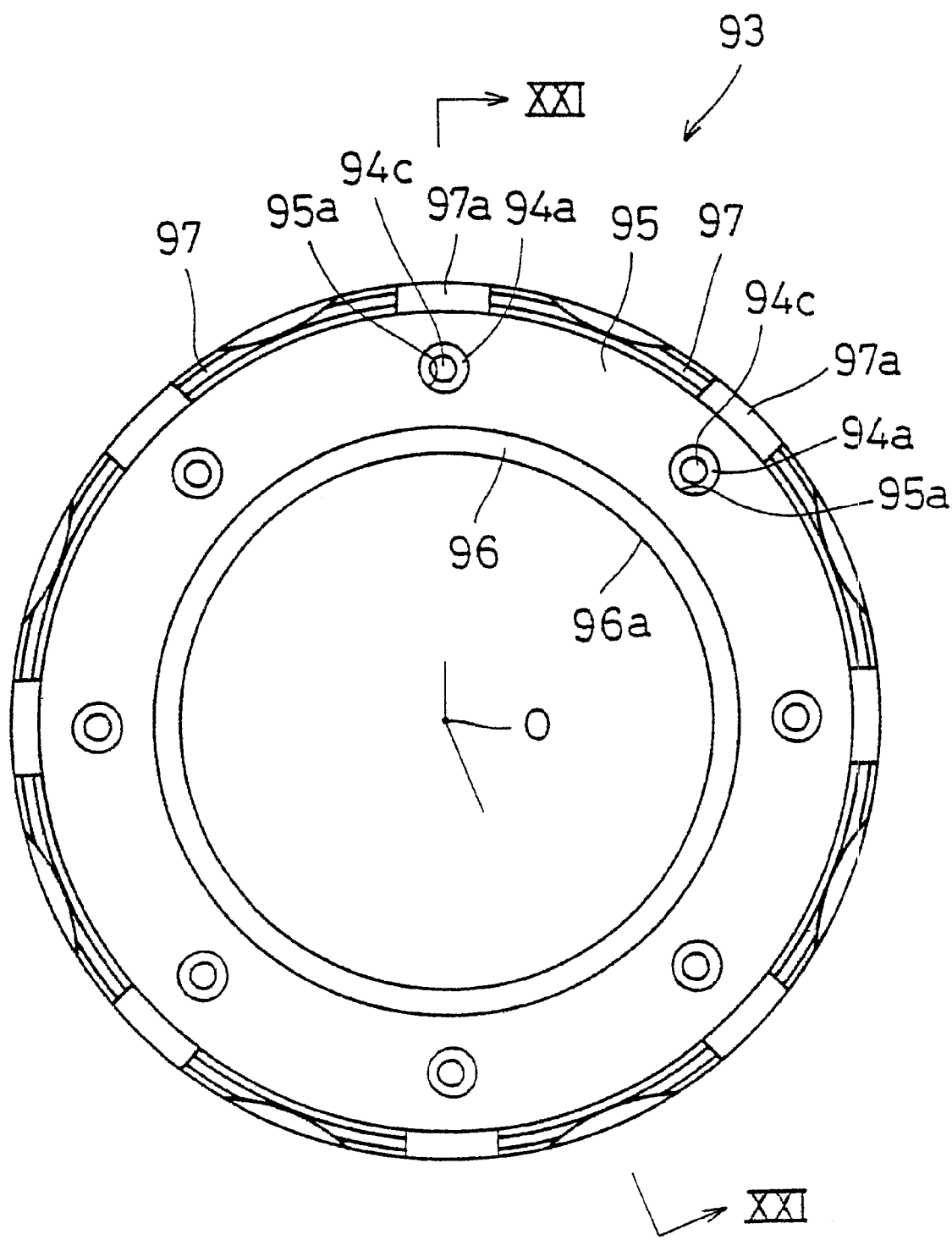
FIG. 20 is a front side elevational view of a friction bushing for use with the clutch disk assembly illustrated in FIG. 1 in accordance with the present invention.
Figure 21:
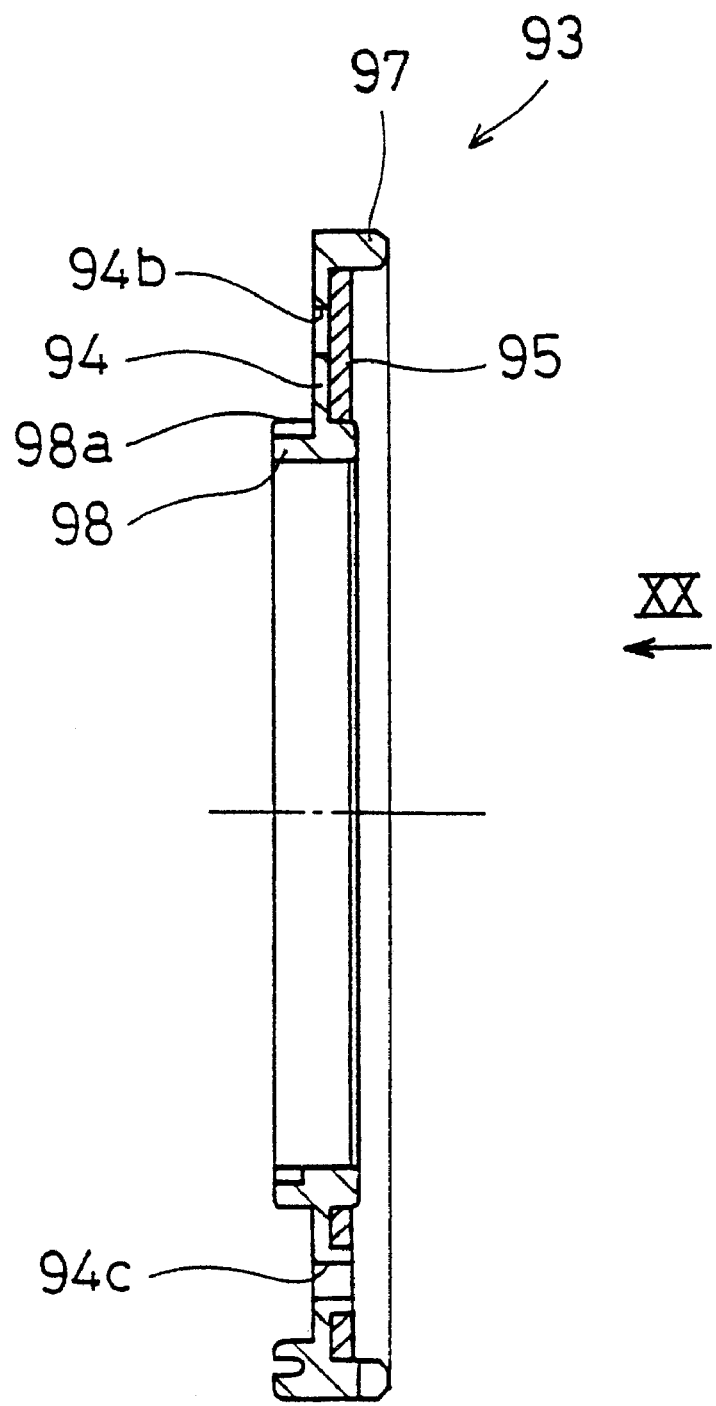
FIG. 21 is a cross sectional view of the friction bushing illustrated in FIG. 20 as viewed along section line XXI—XXI of FIG. 20.
Figure 22:
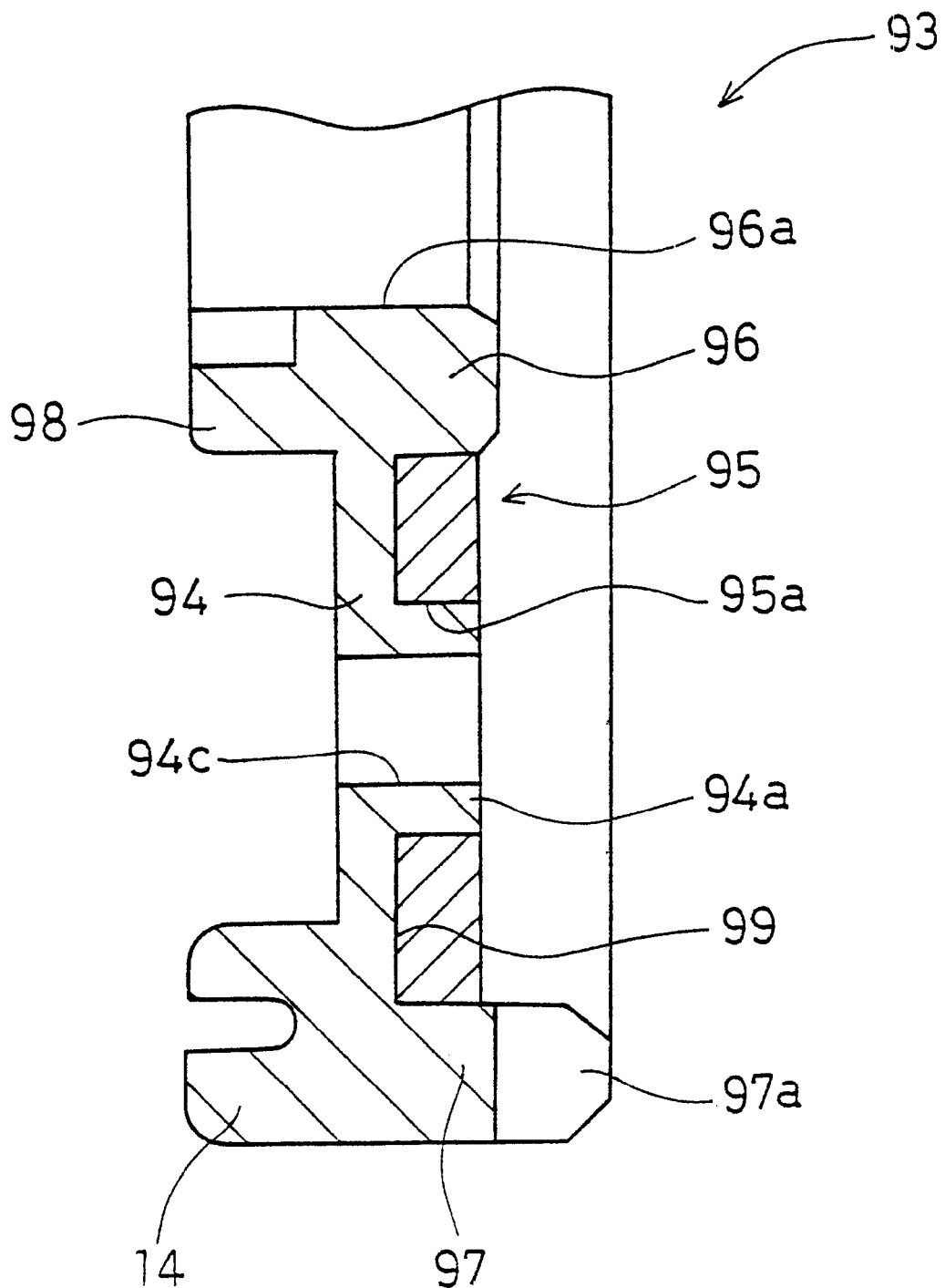
FIG. 22 is an enlarged, partial cross sectional view of a part the friction bushing illustrated in FIG. 21.

Referring to FIGS. 3–5 and 20–22, a bushing 93, which forms a part of a third dampening mechanism, will now be described in more detail. The bushing 93 is disposed at the inner circumference of the clutch plate 31 and touches the outer circumferential face of the hub 3, the end face of the flange 64, the external teeth 65, the cylinder-shaped portion 59 of the hub flange 18 and the internal teeth 61. Functions of the bushing 93 includes dampening vibrations in a rotary direction by generating a friction, determining a radial position of the clutch plate 31 relative to the hub 3, and determining a radial position of the hub flange 18 relative to the hub 3. The bushing 93, as shown in FIGS. 20 to 22, includes mainly an annular resin portion 94. The annular portion 94 is a disk-shaped portion that has a predetermined width in the radial direction and a small thickness in the axial direction. The annular portion 94 is disposed axially between the inner circumference of the clutch plate 31 and the inner circumference of the hub flange 18. An annular friction portion 95 is molded to, bonded to, or simply disposed at the annular portion 94 on the second axial side. The friction portion 95 is annular and disk-shaped, and has a predetermined width in the radial direction and a small thickness in the axial direction. The friction portion 95 is made of a material having a high friction coefficient, for example, a rubber type material, a glass type mixed fiber, spinning or impregnated compact, or a ceramic. The friction portion 95 gives a characteristic of a high friction coefficient to the bushing 93. The magnitude of its friction can be adjusted by selecting the material of friction portion 95 having a desired friction coefficient.

As shown in a plan view of FIG. 20, the inner and outer peripheries of the annular portion 94 and the friction portion 95 are circular. The friction portion 95 can be disposed so as to touch the side face of the annular portion 94 on the second axial side, or can be disposed within a channel, which is formed at the side face of the annular portion 94 on the second axial side. In other words, a cylinder-shaped part 96 is formed at the inner circumferential edge of the annular portion 94, extending toward the second axial side therefrom, and a cylinder-shaped part 97 is formed at the outer circumferential edge of the annular portion 94, extending toward the second axial side therefrom. An annular space surrounded by the cylinder-shaped portions 96 and 97 forms a channel of the annular portion 94. Inner and outer peripheries of the channel are circular, and the friction portion 95 is disposed within the channel.

The cylinder-shaped portion 96, i.e., the bushing 93, touches the side face of the flange 64 of the hub 3 on the first axial side as seen in FIG. 4. The bushing 93 and the flange 64 are urged towards each other by the second cone spring 78. The cylinder-shaped portion 96 and the flange 64 slide within the first range of torsional angle. The friction portion 95, i.e., bushing 93, touches the cylinder-shaped portion 59 of the hub flange 18 and the end face of the internal teeth 61 on the first axial side. The bushing 93, in other words, the clutch plate 31 and the hub flange 18 are urged towards each other by the first cone spring 49. This portion slides within the second range of torsional angle. A small gap is secured between the friction portion 95 and the side face of the external teeth 65 of the hub 3 on the first axial side. The cylinder-shaped portion 59 of the hub flange 18 and the end face of the internal teeth 61 on the first axial side touch only the friction portion 95 in an axial direction.

Several holes 95a are formed side by side in a circular direction at the friction portion 95, and projections 94a of the annular portion 94 are inserted in the holes 95a. In this way, a whirl stop between the annular portion 94 and the friction portion 95 is achieved. Particularly, since the friction portion 95 has a circular shape, such a whirl stop plays an important role. In conventional friction portions, even when a friction portion is adhered to a backboard made of SPCC, as long as the friction portion is circular, there is a possibility of a problem in relation to the strength of the friction portion, such as a friction portion peeling off from the backboard. Therefore, in the prior arts, a whirl stop is achieved by using a friction portion having a square shape. While the friction portion 95 in accordance with the present invention has a simple structure with a circular shape, it does not have a problem such as a peeling. Particularly, it is easy to form the holes 95a of the friction portion 95 and the projections 94a of the annular resin portion 94, resulting in a reduction of a cost.

In the present embodiment, since the friction portion 95 is not fixedly coupled to the annular portion 94, the friction portion 95 can come off in the axial direction. Therefore, processes such as bonding are not necessary. However, in this embodiment in accordance with the present invention, the friction portion 95 may be bonded to the annual portion 94.

Several holes 94b are formed side by side in the circular direction in the annual portion 94. The holes 94b extend in the axial direction. Also, the holes 94b connect the first axial side and second axial side of the annular portion 94, and expose a part of the first axial side face of the friction portion 95. As seen in FIG. 3, holes 13 are formed at the inner circumference of the clutch plate 31, corresponding to the holes 94b. The holes 13 have a diameter larger than that of the holes 94b, and expand beyond the circumference of the holes 94b. Thus, a part of the friction portion 95 is exposed to the outside of the clutch disk assembly 1 through the holes 94b and the holes 13, which are formed at identical positions. Therefore, the friction portion 95 is cooled sufficiently, in other words, the friction portion 95 radiates a heat to an outer atmosphere on the clutch plate 31 side, resulting in a prevention of a change of the friction characteristic due to a friction heat of the friction portion 95. Moreover, resistance to wear of the friction portion 95 increases. In addition, holes 94c are formed extending in an axial direction and penetrating the projections 94a. The holes 94c connect the first and second axial sides of the annular portion 94. The holes 94b and 94c reduce a total volume of the bushing 93, resulting in a reduction of an amount of resin used and therefor a reduction of cost.

A cylinder-shaped part 98 extending towards the first axial side is formed at the inner circumferential edge of the annular portion 94. The inner circumferential face of the cylinder-shaped portions 96 and 98 touches the outer circumferential face of the boss 62. In this way, the clutch plate 31 and the retaining plate 32 are radially positioned (centered) relative to the hub 3. In addition, a channel 98a connecting with a plurality of projections that are formed at the inner circumferential edge of the clutch plate 31 is formed at the outer circumferential face of the cylinder-shaped portion 98. In this way, the bushing 93 can rotate together with the clutch plate 31, and slide against the flange 64 of the hub 3 and the cylinder-shaped portion 59 of the hub flange 18.

A plurality of cutouts 97a is formed at the cylinder-shaped portion 97. The radial inner side face of the cylinder-shaped portion 97 touches the outer circumferential face on the first axial side of the cylinder-shaped portion 59 of the hub flange 18. In other words, the hub flange 18 is positioned radially relative to the hub 3, the clutch plate 31 and the retaining plate 32, by the cylinder-shaped portion 97 of the bushing 93.

A plurality of connecting parts 14 extending toward the first axial side is formed at the outer circumferential edge of the annular portion 94. The connecting parts 14 are formed at equal intervals in the circular direction. The connecting parts 14 have nail like shapes, and are connected with holes 15 formed on the clutch plate 31 as seen in FIG. 4. Thus, the bushing 93 is temporarily connected with the clutch plate 31 in the axial direction.

The bushing 93 mentioned above positions the clutch plate 31 relative to the hub 3 in a radial direction by touching the outer circumferential face of the boss 62, and generates a hysteresis torque of the first and second ranges from a friction face that touches each of the flange 64 and the cylinder-shaped part 59. In other words, a single member has a plurality of functions, resulting in a reduced number of total members.

When the clutch disk 33 of the input rotary portion 2 is pressed against a flywheel (not shown in the Figures), a torque is inputted to the clutch disk assembly 1. The torque is then transmitted from the clutch plate 31 and the retaining plate 32 to the first spring 16, the hub flange 18, the spacer 80, the fixing plate 20, the second spring 21 and the bushing 19 in this order. Finally, the torque is outputted from the hub 3 to the transmission shaft (not shown in the Figures).

When a torque fluctuation from an engine is inputted to the clutch disk assembly 1, a torsion vibration or a relative rotation is caused between the input rotary portion 2 and the hub 3, whereby the first springs 16, the springs 17 and the second springs 21 are compressed in the rotary direction.

Figure 7:
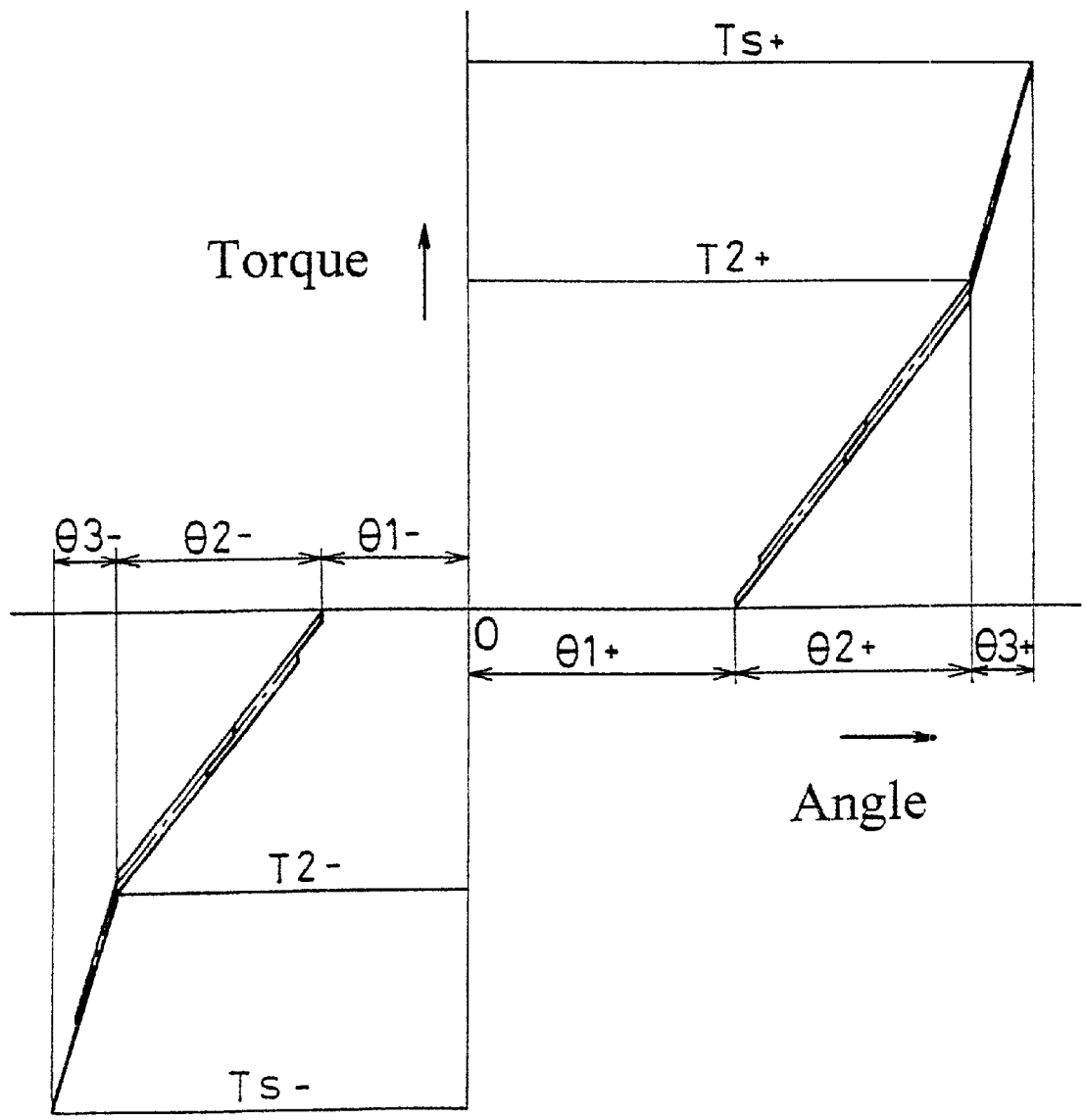
FIG. 7 shows a torsion characteristic curve of the clutch disk assembly in accordance with the present invention.

Referring to a machine circuit in FIG. 6 and a torsion characteristic curve in FIG. 7, an operation of the clutch disk assembly 1 as a dampening mechanism will now be described in more detail. The machine circuit shown in FIG. 6 indicates a schematic view of a dampening mechanism 4 formed between the input rotary portion 2 and the hub 3. In FIG. 6, relationships between portions, particularly when the hub 3 is twisted in a certain direction (e.g., R2 direction) against the input rotary portion 2 are shown.

When the hub 3 is twisted in a R2 direction against the input rotary portion 2, the second dampening mechanism 6 mainly operates within a range of a torsion angle of up to $\theta_1$. In other words, the second springs 21 are compressed in the rotary direction, causing a slip in the second friction mechanism 10. In this case, since a slip is not caused in the first friction mechanism 8, a characteristic of a high hysteresis torque does not appear. As a result, a characteristic of the first range of torsion angle with a low rigidity and a low hysteresis torque is obtained. When the torsion angle exceeds the torsion angle $\theta_1$, the second stopper 12 touches, stopping a relative rotation between the hub 3 and the hub flange 18. In other words, the second dampening mechanism 6 does not operate when the torsion angle is larger than $\theta_1$. Thus, the second springs 21 are not compressed when the torsion angle is larger than $\theta_1$. Therefore, the second springs 21 are not likely to be broken. In addition, it is not necessary to consider the strengths of the second springs 21, whereby design of the second springs 21 is easy. The first dampening mechanism 5 operates at the second range of a torsion angle. In other words, the first springs 16 are compressed in the rotary direction between the hub flange 18 and the input rotary portion 2, resulting in a slip in the first friction mechanism 8. As a result, a characteristic of the second range of torsion angle with a high rigidity and a high hysteresis torque is obtained. When the torsion angle is larger than $\theta_1+\theta_2$, the circular end of the springs 17 touches the second supporting part 37 of the second receptacle 36. In other words, in the second dampening mechanism 6, the first springs 16 and the springs 17 are compressed in parallel. As a result, rigidity in the third range of torsion angle is higher than that in the second range. When the torsion angle is $\theta_1+\theta_2+\theta_3$, the first stopper 11 touches, stopping a relative rotation between the input rotary portion 2 and the hub 3.

In a negative side of a torsion angle, a similar characteristic is obtained although a magnitude of each predetermined torsion angle ($\theta_1$, $\theta_2$, and $\theta_3$) is different. In the first range of torsion angle, a friction is generated between the bushing 93 and both the flange 64 of the hub 3, and between the bush 93 and the external teeth 65. In the second and third ranges, a friction is generated between the bushing 93 and the inner circumference of the hub flange 18.

Another Embodiment

Figure 23:
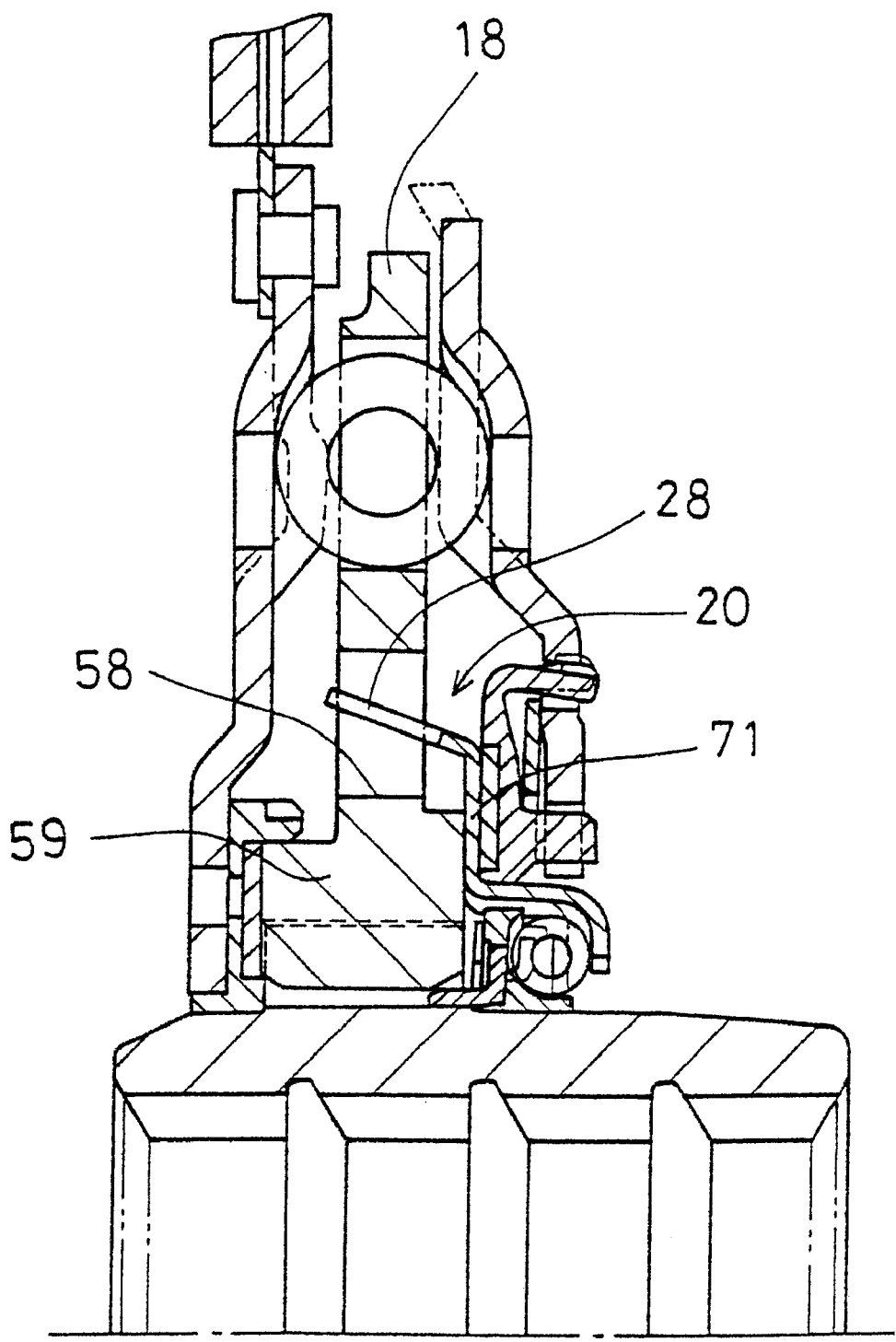
FIG. 23 is a partial cross sectional view of a part of a clutch disk assembly in accordance with another embodiment of the present invention, corresponding to FIG. 3 of the first embodiment.

As shown in FIG. 23, the spacer 80, described in the above embodiment, can be removed, and the fixing plate 20 may be connected directly with the hub flange 18. A first disk-shaped part 71 of the fixing plate 20 is supported directly by a cylinder-shaped part 59 of a hub flange 18. In addition, connecting nails 28 extend from the outer circumferential edge of the first disk-shaped part 71 into connecting holes 58 of the hub flange 18. In this structure, the spacer 80 can be removed, resulting in a even smaller number of parts.

In the machine circuit in FIG. 6, an elastic portion such as a spring may be disposed in lieu of the spacer 80. In that case, four ranges of characteristics can be obtained. In the description of the present embodiment, phrases such as "connected so as to rotate together" or "connected relatively unrotatably" means that related portions are disposed so as to be able to transmit a torque in the circular direction. It also includes a case in which a gap is formed in a rotary direction between the related portions, and a torque is not transmitted until the relative rotation therebetween reaches a predetermined angle corresponding to the gap.

Structure of the Clutch Disk Assembly for an Axial Support

Figure 24:
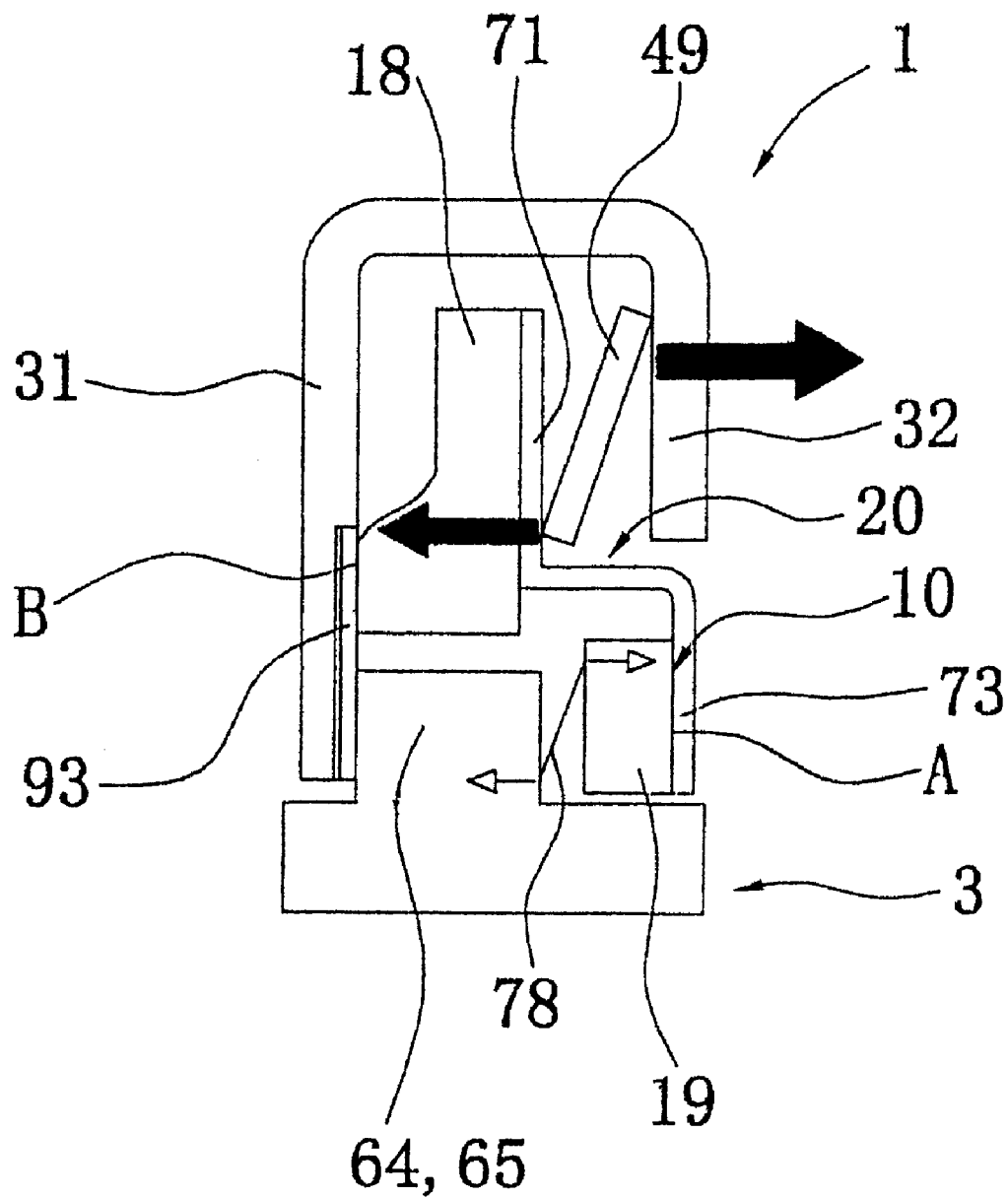
FIG. 24 is a schematic diagram showing a simplified structure of each portion in the clutch disk assembly according to the present invention.

Referring now to FIG. 24, the structure of the present invention which enables a constant and stable friction in the second friction mechanism 10 that operates in the first range of torsional angle will now be described. FIG. 24 is a schematic diagram showing a simplified structure of each portion in the clutch disk assembly 1 according to the present invention (either of the illustrated embodiments or modified versions thereof. In FIG. 24, the forces applied in both axial directions are depicted in respective arrows, and the relationships between each portion in radial and circular directions are omitted.

In order to understand the schematic diagram of FIG. 24, it will be helpful to refer to FIGS. 3–5 of the first embodiment and FIG. 23 of the second embodiment. In the clutch disk assembly 1 according to the present invention, the clutch plate 31 (a first rotary plate) and the retaining plate 32 (a second rotary plate) are two plate members that are disposed with an axial space therebetween as seen in FIG. 3. Their axial positions relative to each other are determined by being fixedly coupled to each other as seen in FIG. 5. The clutch plate 31 and the retaining plate 32 are made of metal plates and may be deformed to a certain degree in the axial direction upon receiving a large force.

An intermediate member that mainly includes the hub flange 18 (an intermediate plate) is disposed between the clutch plate 31 and the retaining plate 32. The position of the intermediate member may be shifted in the axial direction between the clutch plate 31 and the retaining plate 32 as discussed above. The intermediate member also includes the fixing plate 20 and the spacer 80, which are movable in the axial directions together with the hub flange 18. The first axial side of the hub flange 18 is supported by the second axial side of the clutch plate 31. More specifically, the first axial side of the hub flange 18 contacts the bushing 93, which is connected to the clutch plate 31. The first cone spring 49 is a conically shaped ring that is disposed between the hub flange 18 and the retaining plate 32. The first cone spring 49 is disposed so as to be compressed in the axial direction between the plates 31 and 32, applying urging force in the axial direction against the intermediate member and the retaining plate 32. Accordingly, the hub flange 18 as the intermediate member is strongly pressed towards the clutch plate 31. In this way, the axial positions of the hub flange 18 and the fixing plate 20 with respect to the plates 31 and 32 are determined by the first cone spring 49.

The fixing plate 20 is placed between the hub flange 18 and the first cone spring 49. A first disk-shaped part 71 (a first part), which is a peripheral portion of the fixing plate 20, is strongly biased towards the hub flange 18 by the first cone spring 49. In the illustrated embodiments, the fixing plate 20 does not normally move in the axial direction relative to the plates 31 and 32 and the hub flange 18 since the resiliency of the first cone spring 49 is large and holds the hub flange 18 and the fixing plate 20 against the plate 31. Of course, upon wear occurring within clutch disk assembly 1, the hub flange 18 and fixing plate 20 will move axially under the force of the first cone spring 49. In the structure mentioned above, the plates 31 and 32 and the intermediate member (18 and 20) are integrated in the axial direction. Also, the resiliency of the first cone spring 49 is not exerted on a second disk-shaped part 73 (a second part, a supporting portion), which is an inner portion of the fixing plate 20. The inner portion of the clutch plate 31 and the second disk-shaped part 73 of the fixing plate 20 are opposed to each other with an axial interval or space formed therebetween.

The hub 3 includes a flange 64 with external teeth 65 that extend in the radial direction. The hub 3 is located at an inner peripheral side of the plates 31 and 32 and the hub flange 18. The flange 64 is disposed between the inner portion of the clutch plate 31 and the second disk-shaped part 73 of the fixing plate 20. The second axial side of the clutch plate 31 axially supports the first axial side of the flange 64. More specifically, the flange 64 contacts the bushing 93.

The bushing 19 is located axially between the flange 64 and an inner peripheral portion of the fixing plate 20. More specifically, the bushing 19 is disposed next to the second disk-shaped part 73 of the fixing plate 20. The bushing 19 contacts the first axial side of the second disk-shaped part 73 and forms the second friction mechanism 10. The second cone spring 78 is a conically shaped ring that is disposed between the flange 64 and the bushing 19 for applying a resilient biasing force between the flange 64 and the bushing 19 in the axial direction. As a result, the hub 3 is urged toward the clutch plate 31, and the bushing 19 (the first friction member) is strongly pressed against the second disk-shaped part 73 of the fixing plate 20. In this manner, the axial positions of the hub 3 and the bushing 19 are determined with respect to the plates 31 and 32 and the hub flange 18 by the second cone spring 78. It is unlikely that the bushing 19 moves the fixing plate 20 to the transmission side (right) because the urging force of the second cone spring 78 (the second urging member) is significantly smaller than that of the first cone spring 49 (the first urging member). Also, the second disk-shaped part 73 of the fixing plate 20 has a sufficient rigidity to withstand a deformation caused by a urging force applied by the second cone spring 78.

Following effects can be obtained by the clutch disk assembly 1 according to the present invention that has the axial supporting structure shown in FIG. 24. First, in the second friction mechanism 10, the axial position of the fixing plate 20, which is a supporting member to support a load from the second cone spring 78, is determined by the first cone spring 49 with respect to the plates 31 and 32 and the hub flange 18. More specifically, the cone spring 49 applies a load to the fixing plate 20 in the first axial direction, whereas the second cone spring 78 applies a load to the fixing plate 20 in the opposite direction (second axial direction). As a result, unlike other prior art, a load which makes the fixing plate 20 move in the second axial direction is generated only by the second cone spring 78. Accordingly, the fixing plate 20 does not move in the axial direction when there is no wear in any of the members. Second, the resiliency of the first cone spring 49 is in balance with the positions of the plates 31 and 32 and the hub flange 18 such that the urging force of the first cone spring 49 does not affect the angle of the second cone spring 78. Especially, the second disk-shaped part 73 is not deformed by the first cone spring 49, since the load from the first cone spring 49 is exerted on the first-disk part 71 but not on the second disk-shaped part 73 of the fixing plate 20 that forms the supporting portion of the second friction mechanism 10.

In relation to the above, according to the present invention, the inner portion of the fixing plate 20 is maintained in the predetermined axial position and hysteresis torque generated by the second friction mechanism 10 is stabilized. This can be achieved with little fluctuation among clutch disk assemblies manufactured.

Wear Compensation Mechanism

In the second dampening mechanism 6 as seen in FIG. 4, when the bushing 19 wears on the friction surface that slides against the fixing plate 20, the position of the bushing 19 can be shifted in the second axial direction with respect to the other members of the mechanism 6. In that case, the angle of the second cone spring 78 changes so as to be more perpendicular to the fixing plate 20. Accordingly, the urging force (set load) of the second cone spring 78 changes. As a result, hysteresis torque generated by the second friction mechanism 10 becomes unstable.

However, the clutch disk assembly 1 according to the present invention has a following wear compensation mechanism, and therefore is capable of stabilizing the magnitude of hysteresis torque generated by the second friction mechanism 10, regardless of the degree of wear in the bushing 19. The wear compensation mechanism has a structure which restricts a shifting of the intermediate member (the hub flange 18, the fixing plate 20, etc.) toward the clutch plate 31, as well as enables a shifting of the intermediate member toward the clutch plate 31 as the friction surface of the bushing 19 that slides against the fixing plate 20 wears. The amount of the shifting of the intermediate member should be ideally the amount of wear of the bushing 19, and the closer the amount of the shifting is to the amount of wear, the better. The wear compensation mechanism comprises an urging mechanism which urges the intermediate member toward the clutch plate 31 and a supporting mechanism which supports a clutch plate 31 side of the intermediate member. The urging mechanism basically includes the first cone spring 49 which has an urging force significantly larger than that of the second cone spring 78. The first cone spring 49 urges the fixing plate 20 in the first axial direction. The urging force of the first cone spring 49 is exerted on the hub flange 18.

The supporting mechanism comprises a friction mechanism, which supports the clutch plate 31 side of the intermediate member. The friction mechanism has a function, which allows the intermediate member to shift toward the clutch plate 31, as the friction mechanism wears. The wear in the friction mechanism is caused when the plates 31 and 32 rotate relatively to the intermediate member (the hub flange 18). The friction mechanism mainly includes the bushing 93, which is supported by the clutch plate 31 for supporting the first axial side of the hub flange 18. The bushing 93 rotates together with the clutch plate 31 and is adapted to slide against the hub flange 18 in the rotary direction. If the degree of wear on a friction surface A of the second friction mechanism 10 corresponds to or coincides with the degree of wear on the friction surface B between the bushing 93 and the hub flange 18 after a predetermined period of time elapsed during operation of the clutch disk assembly 1, following effects can be obtained.

As the friction surface A of the bushing 19 which is made of resin wears, the bushing 19 tends to move to the second axial direction. On the other hand, the friction surface B of the bushing 93 wears at a part (a friction member 95) that faces the cylinder-shaped portion 59 of the hub flange 18. The intermediate member including the hub flange 18, the spacer 80, the fixing plate 20, and the first friction washer 48 shifts to the first axial direction by a distance corresponding to the amount of wear of the friction surface B. For this reason, the second disk-shaped part 73 of the fixing plate 20 that faces the friction surface A of the second friction mechanism 10 moves in the first axial direction. As a result, the bushing 19, despite its wear, does not move to the second axial direction. Thus, the position of the bushing 19 in the axial direction relative to the hub 3 does not change practically, and hence, the angle of the second cone spring 78 which is disposed between the flange 64 and the bushing 19 does not change substantially. In this manner, by using the wear compensation mechanism which utilizes the hub flange 18 or the first friction mechanism 8, it is possible to maintain the angle of the cone spring 78 constantly regardless of the amount of wear on the friction surface A of the second friction mechanism 10. As a result, a hysteresis torque can be generated in a stable manner in the second friction mechanism 10. Accordingly, the clutch disk 1 can generate a hysteresis torque with little fluctuation even when used for a long period of time, demonstrating an improved vibration-noise performance. Also, since it is not necessary to take into account the wear of the second cone spring 78, the second cone spring 78 may be designed more freely. More specifically, it is possible to design the second cone spring 78 so as to possess low stress and high load.

The set load of the second cone spring 78 is adjusted to a load close to a peak of the load curve thereof. The load of the second cone spring 78 is always maintained near maximum when the amounts of wears of the bushing 19 and the bushing 93 are substantially the same. When the amount of the wear on the friction surface A is different from that of the friction surface B, the set load shifts from the peak of its load curve depending on the amount of wear. In this case, it is designed such that the amount of change of the set load is minimal. Also, it is possible to predetermine how much the set load will change.

The Effect of the Invention

In a damper disk assembly according to the present invention, a hysteresis torque generated between the supporting portion of the intermediate member and the friction surface of the friction member is stable, since the urging force of the second urging member does not act on the supporting part of the intermediate member, which is urged by the first urging member.

The present invention may be applied to a dampening disk assembly other than a clutch disk assembly. For instance, it is possible to apply the present invention to a dampening disk assembly which couples two flywheels in a rotary direction or a dampening disk which has no clutch.

While only two embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A dampening disk assembly, comprising:

a first rotary plate having a first axial side and a second axial side;

a second rotary plate disposed at said second axial side of said first rotary plate, said second rotary plate being fixedly coupled to said first rotary plate with a space formed therebetween;

an intermediate member disposed in said space between said first rotary plate and said second rotary plate, said intermediate member having a first axial side being axially supported by said first rotary plate and a second axial side facing said second rotary plate, said intermediate member including a supporting portion located at an inner circumferential portion of said second axial side of said intermediate plate;

an elastic member coupling said first rotary plate and said second rotary plate to said intermediate member elastically in a rotary direction;

an output hub disposed adjacent to said inner circumferential portion of said intermediate member between said first rotary plate and said second rotary plate, said output hub having a cylinder-shaped portion and a flange portion extending in a radial direction-from said cylinder-shaped portion, said flange portion having a first axial side being axially supported by said first rotary plate and a second axial side being disposed adjacent to a first axial surface of said supporting portion of said intermediate member with a space formed therebetween;

a friction generating mechanism disposed between said flange portion and said supporting portion to generate friction as said output hub rotates relatively against said intermediate member, said friction generating mechanism comprising a first friction member connected with said output hub in a relatively non-rotatable but axially movable manner and abutting said first axial surface of said supporting portion, and a first urging member disposed on said second axial side of said intermediate member in a compressed manner axially between said flange portion and said first friction member to apply a first resilient force to said first friction member and said flange portion; and a second urging member disposed on said second axial side of said intermediate member in a compressed manner axially between said second rotary plate and a portion of said intermediate member other than said supporting portion to apply a second resilient force larger than said first resilient force of said first urging member to said intermediate member and said second rotary plate.

2. A dampening disk assembly as set forth in claim 1, wherein
said intermediate member further including an intermediate plate forming said first axial side of said intermediate member that is axially supported by said first rotary plate, and a supporting member having first and second parts, said first part being disposed between said intermediate plate and said second urging member for receiving a torque from said intermediate plate, and said second part forming said supporting portion of said intermediate member.

3. A dampening disk assembly as set forth in claim 2, further comprising
a second friction member disposed between said first part of said supporting member and said second urging member for rotating together with said second rotary plate.

4. A dampening disk assembly as set forth in claim 3, further comprising
a third friction member disposed between said first rotary plate and said intermediate member to generate friction when said intermediate plate rotates relative to said first rotary plate.

5. A dampening disk assembly as set forth in claim 3, wherein
said output hub has a set of first teeth and said intermediate plate has a set of second teeth that operatively engage said first teeth after a predetermined amount of relative rotation between said output hub and said intermediate plate.

6. A dampening disk assembly as set forth in claim 5, further comprising
a second elastic member coupled between said first friction member and said supporting portion of said supporting member to elastically couple said first friction member and said supporting portion in a rotary direction.

7. A dampening disk assembly as set forth in claim 6, wherein
said first friction member has an annular portion located around said output hub and a connecting part extending from said annular portion into gaps formed between said first teeth of said output hub.

8. A dampening disk assembly as set forth in claim 6, wherein
said supporting member is coupled to said intermediate plate by a spacer that is constructed of a resin material.

9. A dampening disk assembly as set forth in claim 6, wherein
said second friction member has at least one flexible detent portion coupled to said second rotary plate in an axially movable manner and a connecting portion engaging said second rotary plate in a non-rotatable manner.

10. A dampening disk assembly as set forth in claim 6, further comprising
a third friction member disposed between said first rotary plate and said intermediate member to generate friction when said intermediate plate rotates relative to said first rotary plate.

11. A dampening disk assembly as set forth in claim 1, wherein
said output hub has a set of first teeth and said intermediate member has a set of second teeth that operatively engage said first teeth after a predetermined amount of relative rotation between said output hub and said intermediate member.

12. A dampening disk assembly as set forth in claim 11, wherein
said first friction member has an annular portion located around said output hub and a connecting part extending from said annular portion into gaps formed between said first teeth of said output hub.

13. A dampening disk assembly as set forth in claim 12, further comprising
a second elastic member coupled between said first friction member and said supporting portion to elastically couple said first friction member and said supporting portion in a rotary direction.

14. A dampening disk assembly as set forth in claim 2, wherein
said supporting member is made of an annular metal plate.

15. A dampening disk assembly as set forth in claim 14, wherein
said first friction member is made of an annular resin.

16. A dampening disk assembly as set forth in claim 1, further comprising
a second friction member disposed between said first rotary plate and said intermediate member to generate friction when said intermediate plate rotates relative to said first rotary plate.

\* \* \* \* \*